US012169378B2

(12) United States Patent
Saito et al.

(10) Patent No.: US 12,169,378 B2
(45) **Date of Patent: *Dec. 17, 2024**

(54) FIXING DEVICE AND IMAGE FORMING APPARATUS

(71) Applicant: CANON KABUSHIKI KAISHA, Tokyo (JP)

(72) Inventors: Shutaro Saito, Tokyo (JP); Takeshi Kozuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,209

(22) Filed: Sep. 19, 2023

(65) Prior Publication Data

US 2024/0004332 A1 Jan. 4, 2024

Related U.S. Application Data

(63) Continuation of application No. 17/851,855, filed on Jun. 28, 2022, now Pat. No. 11,796,943.

(30) Foreign Application Priority Data

Jun. 29, 2021 (JP) ................................ 2021-108166

(51) Int. Cl.
*G03G 15/20* (2006.01)

(52) U.S. Cl.
CPC ..... *G03G 15/2053* (2013.01); *G03G 15/2064* (2013.01); *G03G 2215/2032* (2013.01)

(58) Field of Classification Search
CPC ..... G03G 2215/00561; G03G 15/6567; G03G 2215/00734; G03G 15/607; G03G 15/5095; G03G 2215/00143; G03G 2215/00156; G03G 15/2053; G03G 15/2064; G03G 2215/2032
See application file for complete search history.

(56) References Cited

U.S. PATENT DOCUMENTS

| | | | | |
|---|---|---|---|---|
| 11,796,943 | B2 * | 10/2023 | Saito | G03G 15/2053 |
| 2016/0052737 | A1 * | 2/2016 | Kunihiro | B65H 3/44 271/227 |
| 2018/0052416 | A1 * | 2/2018 | Konno | B41J 13/036 |

FOREIGN PATENT DOCUMENTS

| | | | | |
|---|---|---|---|---|
| CN | 108693727 A | * 10/2018 | | G03G 15/1615 |
| JP | 2003112416 A | * 4/2003 | | B41J 11/0065 |

* cited by examiner

*Primary Examiner* — Sevan A Aydin
(74) *Attorney, Agent, or Firm* — Canon U.S.A., Inc. I.P. Division

(57) ABSTRACT

A fixing device includes an endless fixing belt, a heating roller that heats the fixing belt, a steering roller, and a pressurization rotating member. The steering roller is controlled to swing to move the fixing belt to a prescribed position. The pressurization rotating member pressurizes and forms a fixing nip portion with the fixing belt. When a recording material bearing unfixed toner is nipped and conveyed to the fixing nip portion, an unfixed toner image is fixed to the recording material. A single inclination operation that inclines the steering roller results in an inclination angle that is smaller when a recording material having a length greater than a predetermined length in a recording material conveying direction is conveyed to the fixing nip portion than when a recording material having a length less than or equal to the predetermined length in the conveying direction is conveyed to the fixing nip portion.

6 Claims, 21 Drawing Sheets

| FIRST SENSOR 394 | SECOND SENSOR 395 | THIRD SENSOR 396 | BELT POSITION |
|---|---|---|---|
| 0 | 0 | 0 | FIRST MAXIMUM DEVIATION |
| 1 | 0 | 0 | FRONT 3 |
| 1 | 1 | 0 | FRONT 2 |
| 0 | 1 | 0 | FRONT 1 |
| 0 | 1 | 1 | MIDDLE |
| 1 | 1 | 1 | BACK 1 |
| 1 | 0 | 1 | BACK 2 |
| 0 | 0 | 1 | BACK 3 |
| 0 | 0 | 0 | SECOND MAXIMUM DEVIATION |

SENSOR BLOCKED: 0 SENSOR OPENED: 1

FIG.20

| BELT POSITION | SUBSTITUTED VALUE |
| --- | --- |
| FIRST MAXIMUM DEVIATION | — |
| FRONT 3 | 1 |
| FRONT 2 | 2 |
| FRONT 1 | 3 |
| MIDDLE | 4 |
| BACK 1 | 5 |
| BACK 2 | 6 |
| BACK 3 | 7 |
| SECOND MAXIMUM DEVIATION | — |

FIG.21

| BELT POSITION | SUBSTITUTED VALUE |
|---|---|
| FIRST MAXIMUM DEVIATION | — |
| FRONT 3 | 2 |
| FRONT 2 | 3 |
| FRONT 1 | — |
| MIDDLE | 4 |
| BACK 1 | — |
| BACK 2 | 5 |
| BACK 3 | 6 |
| SECOND MAXIMUM DEVIATION | — |

FIXING DEVICE AND IMAGE FORMING APPARATUS

CROSS REFERENCE TO RELATED APPLICATIONS

The present application is a continuation of U.S. patent application Ser. No. 17/851,855, filed on Jun. 28, 2022, which claims priority from Japanese Patent Application No. 2021-108166, filed Jun. 29, 2021, all of which are hereby incorporated by reference herein in their entireties.

BACKGROUND

Field

The present disclosure relates to an image forming apparatus that forms a toner image on a recording material.

Description of the Related Art

An image forming apparatus includes a fixing device that fixes an unfixed toner image on a recording material to the recording material.

The fixing device includes a rotating member pair including a fixing belt that applies heat to unfixed toner and is rotationally driven, and a pressurization rotating member that pressurizes the fixing belt, thereby forming a nip portion between the pressurization rotating member and the fixing belt, and is rotationally driven. If a recording material on which unfixed toner is placed is conveyed to the nip portion, the heat of the fixing belt and the pressure of the pressurization rotating member are applied to the recording material, thereby fixing the unfixed toner to the recording material (Japanese Patent Application Laid-Open No. 2007-79036).

Japanese Patent Application Laid-Open No. 2015-59964 discusses a technique for detecting the position of a fixing belt in the width direction of the fixing belt. Japanese Patent Application Laid-Open No. 2015-59964 also discusses steering control for reciprocating the fixing belt in the width direction. The fixing belt is repeatedly reciprocated within a predetermined area, whereby it is possible to prevent the fixing belt from coming off a steering roller. It is also possible to prevent an edge portion of a recording material from repeatedly passing through the same area in the fixing belt. Thus, it is possible to prevent the deterioration of the surface of the fixing belt.

Meanwhile, in recent years, there is an increase in opportunities where a recording material the length of which in the conveying direction of the recording material is long is used in a copying machine. Specific examples of the recording material the length of which in the conveying direction is long include a recording material the length of which in the conveying direction is greater than a standard size, namely 19 inches (482.6 mm). There is an increase in opportunities where unfixed toner on such a recording material the length of which in the conveying direction is great is fixed.

The steering control prevents the edge portion of the recording material from repeatedly passing through the same area in the fixing belt and prevents the deterioration of the surface of the fixing belt.

However, when the steering control is performed, the fixing belt is moved in the width direction. With the movement of the fixing belt, the recording material is moved in the width direction in a fixing nip portion.

In a case where the length of the recording material is great, the movement in the width direction of the recording material tends to be greater than in a case where the length of the recording material is small. Particularly, if a long sheet demand for which in printing is increasing in recent years is used for printing, the movement in the width direction of the long sheet in the fixing nip portion is great, and the occurrence of wrinkles is noticeable.

SUMMARY

The fixing device of the present disclosure appropriately performs steering control according to a length of recording material in a conveying direction.

According to an aspect of the present disclosure, a fixing device includes a fixing belt that is endless and configured to rotate, a heating roller configured to abut an inner peripheral surface of the fixing belt and apply heat to the fixing belt, a steering roller configured to abut the inner peripheral surface of the fixing belt together with the heating roller, a pressurization rotating member configured to pressurize the fixing belt, wherein the pressurization rotating member and the fixing belt form a fixing nip portion and, in a case where a recording material bearing unfixed toner is nipped and conveyed to the fixing nip portion, an unfixed toner image is fixed to the recording material, a belt position detection unit configured to detect a position of the fixing belt in a width direction of the fixing belt, and a control unit configured to, based on a detection result of the belt position detection unit, control the steering roller to swing to move the fixing belt to a prescribed position in the width direction, wherein a single inclination operation for inclining the steering roller at an inclination angle results in an inclination angle that is smaller in a case where a recording material having a length greater than a predetermined length in a conveying direction of the recording material is conveyed to the fixing nip portion than in a case where a recording material having a length less than or equal to the predetermined length in the conveying direction is conveyed to the fixing nip portion.

Further features of the present disclosure will become apparent from the following description of exemplary embodiments with reference to the attached drawings.

BRIEF DESCRIPTION OF THE DRAWINGS

FIG. 20 is a table illustrating a relationship between the position of the fixing belt and a substituted value according to the first or third exemplary embodiment.

FIG. 21 is a table illustrating a relationship between the position of the fixing belt and a substituted value according to the third exemplary embodiment.

DESCRIPTION OF THE EMBODIMENTS

<Image Forming Apparatus>

Figure 1:
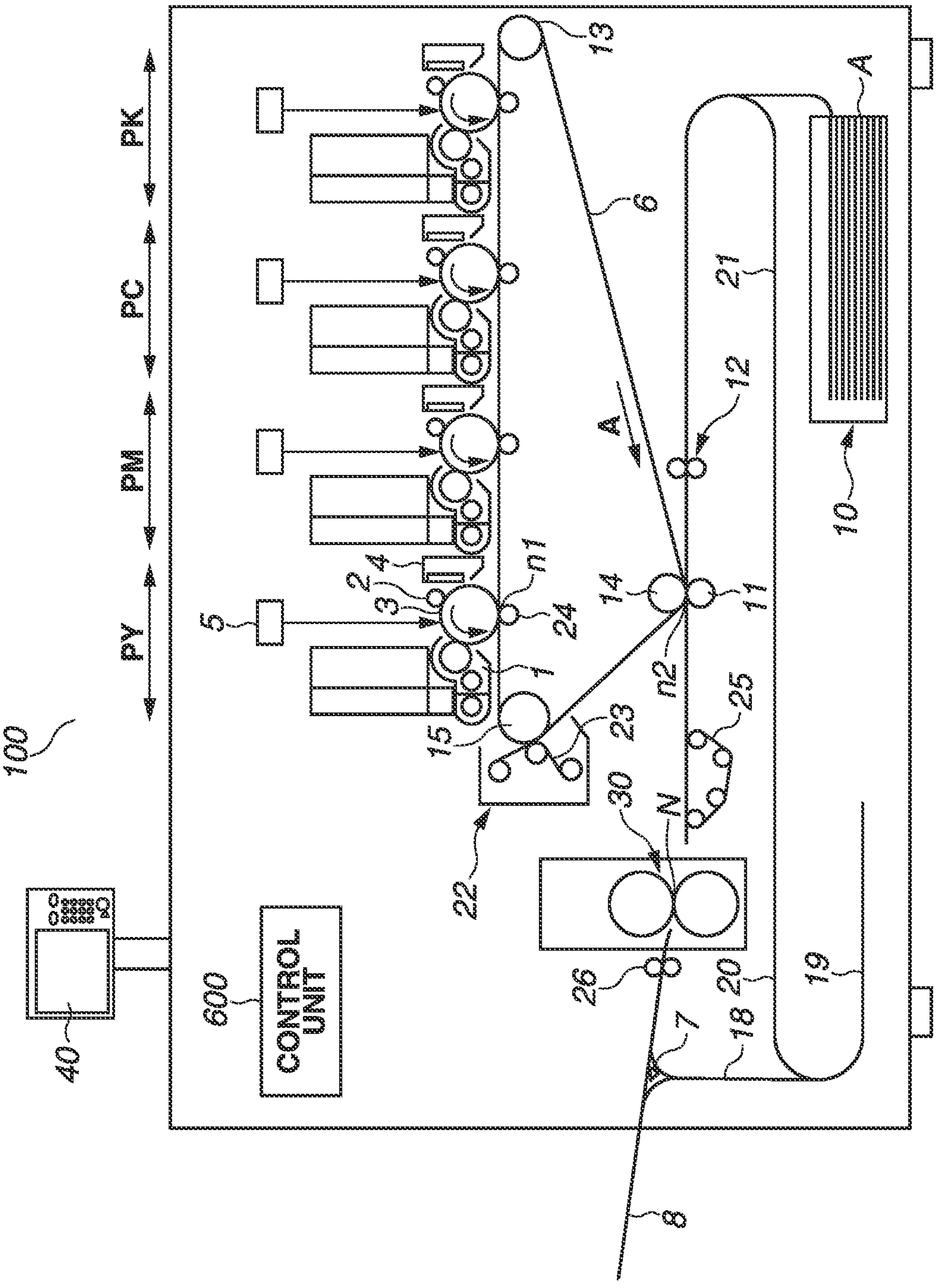
FIG. 1 is a schematic diagram illustrating a configuration of an image forming apparatus.

FIG. 1 is a schematic diagram illustrating the configuration of an image forming apparatus 100. As illustrated in FIG. 1, in the image forming apparatus 100, four types of image forming units, i.e., a yellow image forming unit PY, a magenta image forming unit PM, a cyan image forming unit PC, and a black image forming unit PK, are placed along the moving direction of an intermediate transfer belt 6. First, the process in which a toner image is formed on the intermediate transfer belt 6 will be described taking the yellow image forming unit PY as an example.

The surface of a photosensitive drum 3 rotationally driven by a charging unit 2 is uniformly charged (charging). Then, an exposure device 5 emits laser to the surface of the photosensitive drum 3 according to input image data, thereby forming an electrostatic latent image on the surface of the photosensitive drum 3 (exposure). Then, a developing device 1 forms a yellow toner image on the photosensitive drum 3 (development). A primary transfer roller 24 applies a voltage having a polarity opposite to the potential polarity of the yellow toner image to the intermediate transfer belt 6. Consequently, yellow toner on the photosensitive drum 3 is transferred to the intermediate transfer belt 6 (primary transfer). Yellow toner that has not been transferred and remains on the surface of the photosensitive drum 3 is scraped by a toner cleaner 4 and removed from the surface of the photosensitive drum 3. This series of steps in the process is also similarly performed by the magenta image forming unit PM, the cyan image forming unit PC, and the black image forming unit PK. As a result, a full-color toner image is formed on the intermediate transfer belt 6.

The toner image on the intermediate transfer belt 6 is conveyed to a secondary transfer unit n2 (a transfer nip portion n2) formed by a pair of secondary transfer rollers 11 and 14. According to the timing when the toner image is conveyed, one of recording materials A is taken out of a recording material cassette 10 and fed to the transfer nip portion n2. Then, the toner image on the intermediate transfer belt 6 is transferred to the recording material A (secondary transfer). Specific examples of the recording material A include plain paper, a resin sheet, coated paper, thick paper, and an overhead projector sheet.

The recording material A to which the toner image is transferred is conveyed to a fixing device 30 while being suctioned by a pre-fixing conveying belt 25. Then, the recording material A receives heat and pressure in the fixing device 30, thereby fixing the toner image to the recording material A (fixing). The recording material A to which the toner image is fixed is nipped and conveyed by a sheet discharge roller pair 26 and discharged to a sheet discharge tray 8.

The image forming apparatus 100 can also form a monochrome image. When a monochrome image is formed, only the black image forming unit PK among the plurality of image forming units is driven.

A description will be given of two-sided printing for forming images on both sides of the recording material A. The recording material A on one side of which an image is formed is discharged from the fixing device 30 and then guided to a sheet path 18 by a flapper 7. If the recording material A is conveyed from the sheet path 18 to a reverse path 19, the recording material A is switched back and conveyed on the reverse path 19. Then, the recording material A passes through a two-sided path 20 and is conveyed to a sheet path 21. At this time, the front and back sides of the recording material A are reversed. Then, the recording material A is conveyed to the secondary transfer unit n2 again. If a toner image is transferred to the recording material A, the toner image is fixed by the fixing device 30. Then, the recording material A subjected to the two-sided printing is discharged to the discharge tray 8.

This process from the charging to the discharge of the recording material A to which the toner image is fixed to the discharge tray 8 is referred to as "an image forming process (a print job)". The period when an image is formed is referred to as "during an image forming process (during a print job)".

<Fixing Device>

Next, with reference to FIG. 2, the fixing device 30 according to the present exemplary embodiment will be described.

In the present exemplary embodiment, the fixing device 30 using an endless fixing belt 310 is employed. In FIG. 2, a recording material is conveyed from a direction indicated by an arrow α. The fixing device 30 includes a heating rotating member 300 including the fixing belt 310, and a pressurization rotating member 330 that abuts the fixing belt 310 and applies pressure to the fixing belt 310, thereby forming a nip portion N with the fixing belt 310.

The heating rotating member 300 includes the fixing belt 310, a steering roller 350, a fixing pad 380 as a pad member, and a heating roller 340. The fixing pad 380 and the heating roller 340 abut the inner peripheral surface of the fixing belt 310. The fixing belt 310 is stretched around the fixing pad 380 and the heating roller 340.

The heating roller 340 is formed into a cylindrical shape by a metal such as aluminum or stainless steel. In the present exemplary embodiment, the heating roller 340 is formed of a pipe made of aluminum and having an outer diameter of 80 mm. Within the heating roller 340, a halogen heater 341 is installed as a unit for heating the fixing belt 310. The halogen heater 341 heats the heating roller 340 to a predetermined temperature. The heating roller 340 heated by the heat of the halogen heater 341 heats the fixing belt 310. Based on the temperature detection result of a fixing temperature detection sensor (not illustrated), the fixing belt 310 is controlled to a predetermined target temperature according to the grammage of a recording material as a fixing target.

The heating unit is not limited to a halogen heater. Alternatively, for example, a configuration may be employed in which the heating roller 340 is caused to generate heat by electromagnetic induction heating (IH). The heating roller 340 receives drive from a driving motor M1, thereby being rotationally driven in the direction of an arrow R1.

The fixing belt 310 is excellent in heat conductivity and heat resistance. The shape of the fixing belt 310 is, for example, a thin endless belt having an inner diameter of 120 mm. In the present exemplary embodiment, the fixing belt 310 has a three-layer structure including a base layer, an elastic layer outside the base layer, and a release layer outside the elastic layer. The base layer has a thickness of 60 μm, and the material of the base layer is a polyimide resin (PI). The elastic layer has a thickness of 300 μm, and the material of the elastic layer is silicone rubber. The release layer has a thickness of 30 μm, and the material of the release layer is a perfluoroalkoxy alkane (PFA) (a tetrafluoroethylene-perfluoroalkoxy ethylene copolymer resin) as a fluororesin. The pressurization rotating member 330 abuts the fixing belt 310 and is rotationally driven, whereby the fixing belt 310 is driven to rotate. Since the heating roller 340 is rotationally driven by receiving drive from the driving motor M1, the fixing belt 310 is driven to rotate also by the rotational driving of the heating roller 340.

The fixing pad 380 is placed on the inner peripheral surface of the fixing belt 310 such that the fixing pad 380 is opposed to the pressurization rotating member 330 across the fixing belt 310.

The pressurization rotating member 330 includes a cylindrical metal core made of aluminum, an elastic layer having a thickness of 1 mm outside the metal core, and a release layer for increasing separability from toner outside the elastic layer.

The pressurization rotating member 330 can be moved by an abutment/separation mechanism so that the pressurization rotating member 330 abuts or separates from the fixing belt 310. The abutment/separation mechanism includes a frame 385 and a driving motor (not illustrated). The frame 385 is supported by the image forming apparatus 100. The frame 385 supports the pressurization rotating member 330. The frame 385 receives drive from the driving motor (not illustrated) and is rotated about a rotating shaft 332 as a rotational axis. If the frame 385 is rotated about the rotating shaft 332 as the rotational axis by the driving motor (not illustrated), the pressurization rotating member 330 is moved in the direction of an arrow P. Consequently, the pressurization rotating member 330 abuts the fixing pad 380 across the fixing belt 310 in a direction perpendicular to the conveying direction a of the recording material (an abutment state). This forms the fixing nip portion N. In the present exemplary embodiment, the fixing nip portion N is pressurized with a total pressure force of 2000 N, and the width of the fixing nip portion N is 24 mm. If the frame 385 is rotated about the rotating shaft 332 as the rotational axis in a direction opposite to the direction in which the pressurization rotating member 330 abuts the fixing belt 310, the pressurization rotating member 330 enters the state where the pressurization rotating member 330 is separated from the fixing belt 310 (a separated state).

The pressurization rotating member 330 is also rotationally driven in the direction of an arrow R2. Thus, the fixing belt 310 sandwiched between the pressurization rotating member 330 and the fixing pad 380 is driven to rotate by the rotational driving of the pressurization rotating member 330.

As described above, the heating rotating member 300 and the pressurization rotating member 330 nip and convey a recording material bearing an unfixed toner image in the fixing nip portion N and apply heat and pressure to the recording material, thereby fixing the unfixed toner image to the recording material.

<Steering Roller>

Next, with reference to FIGS. 2 and 3, the steering roller 350 according to the present exemplary embodiment will be described.

In the abutment state according to the present exemplary embodiment, a force of 2000 N is applied to the fixing belt 310. Thus, the surface of the fixing belt 310 may be scratched by an edge portion of a recording material, whereby uneven gloss may occur. The details of the uneven gloss will be described below.

<Uneven Gloss Caused by Paper Edge Scratch>

A “paper edge scratch” refers to a scratch formed on the surface of the fixing belt 310 by a cut end portion (an edge portion) of a recording material. When unfixed toner is fixed to a recording material, a portion of the fixing belt 310 that comes into contact with the edge portion (an edge portion contact portion) is more stressed than a portion of the fixing belt 310 that does not come into contact with the edge portion (an edge portion non-contact portion). An area scratched by the edge portion of the recording material may have a shape more recessed than the edge portion non-contact portion. The recess thus generated on the surface of the fixing belt 310 by the edge portion of the recording material is referred to as a “paper edge scratch”.

When unfixed toner is fixed to a recording material, the fixing device 30 applies pressure and heat to the recording material.

At this time, the surface state of the fixing belt 310 is reflected on the gloss of the surface of the fixed image. If recesses and protrusions exist on the surface of the fixing belt 310, the state of the recesses and protrusions is reflected on the gloss of the surface of the image. Thus, as a result, uneven gloss occurs on the surface of the image.

Thus, if the unfixed toner is fixed to the recording material in the state where a paper edge scratch is formed on the surface of the fixing belt 310, uneven gloss occurs in which a straight line is drawn on the surface of the image.

In the present exemplary embodiment, to prevent a paper edge scratch on the surface of the fixing belt 310, steering control by a steering mechanism 400 for reciprocating the fixing belt 310 in a width direction is used.

Figure 3:
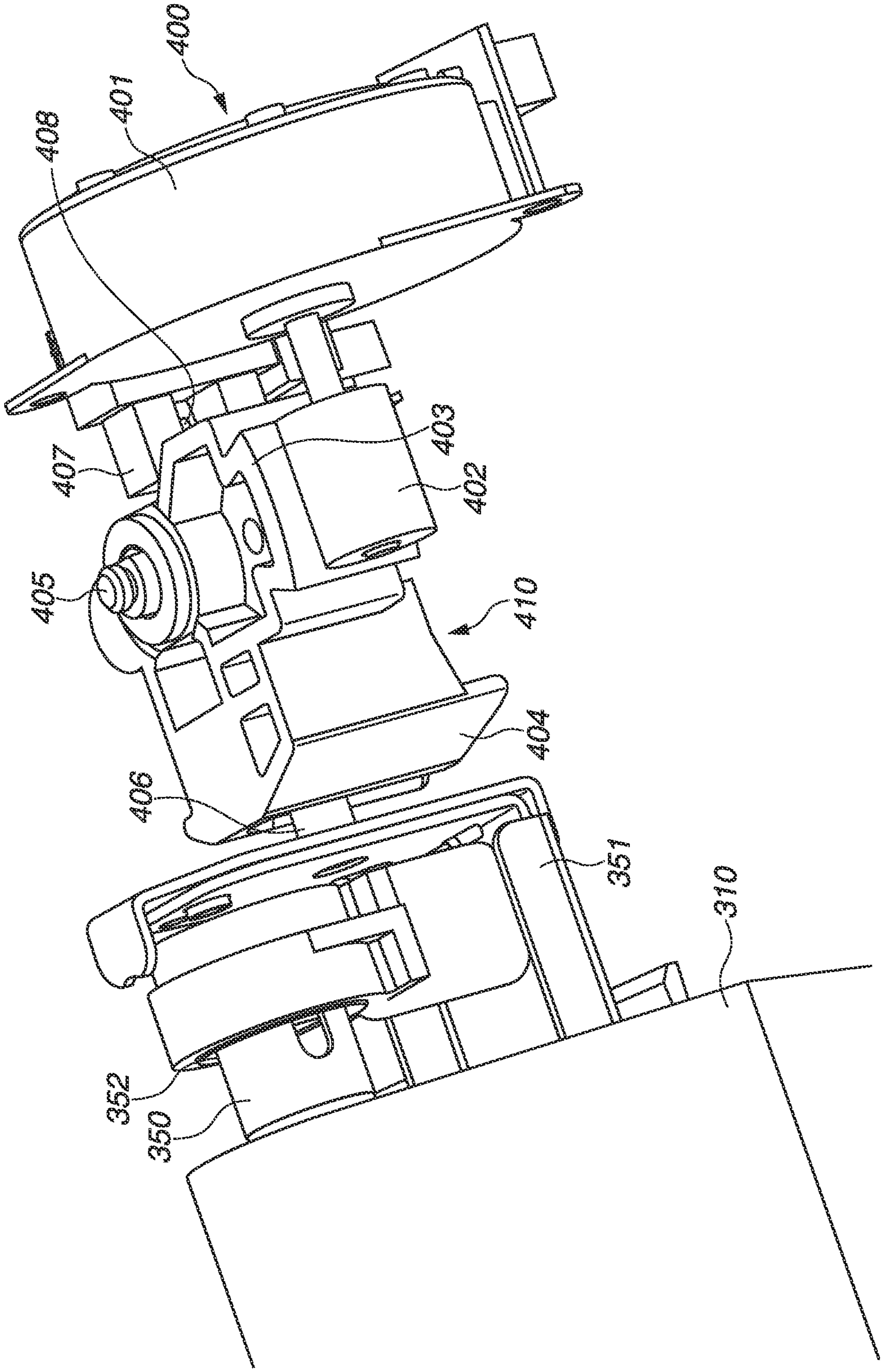
FIG. 3 is a schematic diagram illustrating a steering mechanism.

With reference to FIG. 3, the steering control will be described.

As illustrated in FIG. 3, the steering mechanism 400 includes the steering roller 350, a steering motor 401, a worm 402, a worm wheel 403, and a fork plate 404. The steering motor 401 can rotate in a forward direction and a backward direction. If the steering motor 401 receives a signal from a control unit 600 and is rotationally driven, the worm 402 attached to the steering motor 401 rotates.

The rotation of the worm 402 is converted into a swing in the rotational axis direction of the steering motor 401 about a rotating shaft portion 405 as a swing center by a drive conversion unit 410 in which the worm wheel 403 and the fork plate 404 are integrally formed. That is, the worm wheel 403 is meshed with the worm 402 and provided so that the worm wheel 403 can reciprocate in the rotational axis direction of the steering motor 401 according to the rotation of the worm 402. To this end, a meshing surface of the worm wheel 403 is formed into an arc shape to be meshed with the worm 402 in a central portion of the worm 402 in the rotational axis direction. In this manner, the drive conversion unit 410 can swing about the rotating shaft portion 405 as the swing center via the worm 402 and the worm wheel 403 according to the rotation of the steering motor 401.

The steering mechanism 400 also includes a steering operation shaft 406, a steering roller support arm 351, and a bearing portion 352. The steering operation shaft 406, the steering roller support arm 351, and the bearing portion 352 are integrally formed and attached to the steering roller 350. The bearing portion 352 rotatably supports a rotating shaft of the steering roller 350. The steering roller support arm 351 is provided to be rotationally movable and holds the bearing portion 352, thereby supporting the steering roller 350 to be rotationally movable.

The steering operation shaft 406 fitted to the drive conversion unit 410 is fixed to the steering roller support arm 351. The steering operation shaft 406 is fitted to the fork plate 404 of the drive conversion unit 410 and can move together with the drive conversion unit 410 while being maintained in a state where the steering operation shaft 406 is fitted to the drive conversion unit 410. As described above, the inclination of the steering roller 350 changes in conjunction with the swing of the drive conversion unit 410. That is, it is possible to change the disposition angle of the steering roller 350 to the heating roller 340 (see FIG. 2) by driving the steering motor 401. If the steering angle of the steering roller 350 is thus adjusted, the fixing belt 310 stretched around the steering roller 350 and the heating roller 340 is reciprocated in the width direction. Thus, it is possible to achieve the steering control of the fixing belt 310 for reciprocating the fixing belt 310 within a predetermined area in the width direction. The fixing belt 310 is reciprocated such that the moving direction of the fixing belt 310 is exactly opposite between a case where the steering roller 350 is inclined by rotating the steering motor 401 forward and a case where the steering roller 350 is inclined by rotating the steering motor 401 backward.

As described above, the steering mechanism 400 reciprocates the fixing belt 310 to prescribed positions within an area in the steering roller 350 in the width direction. The fixing belt 310 is reciprocated, whereby it is possible to prevent an edge portion of a recording material from repeatedly passing through the same area on the surface of the fixing belt 310. This can prevent a paper edge scratch that occurs on the surface of the fixing belt 310.

<Fixing Belt Position Detection>

Figure 2:
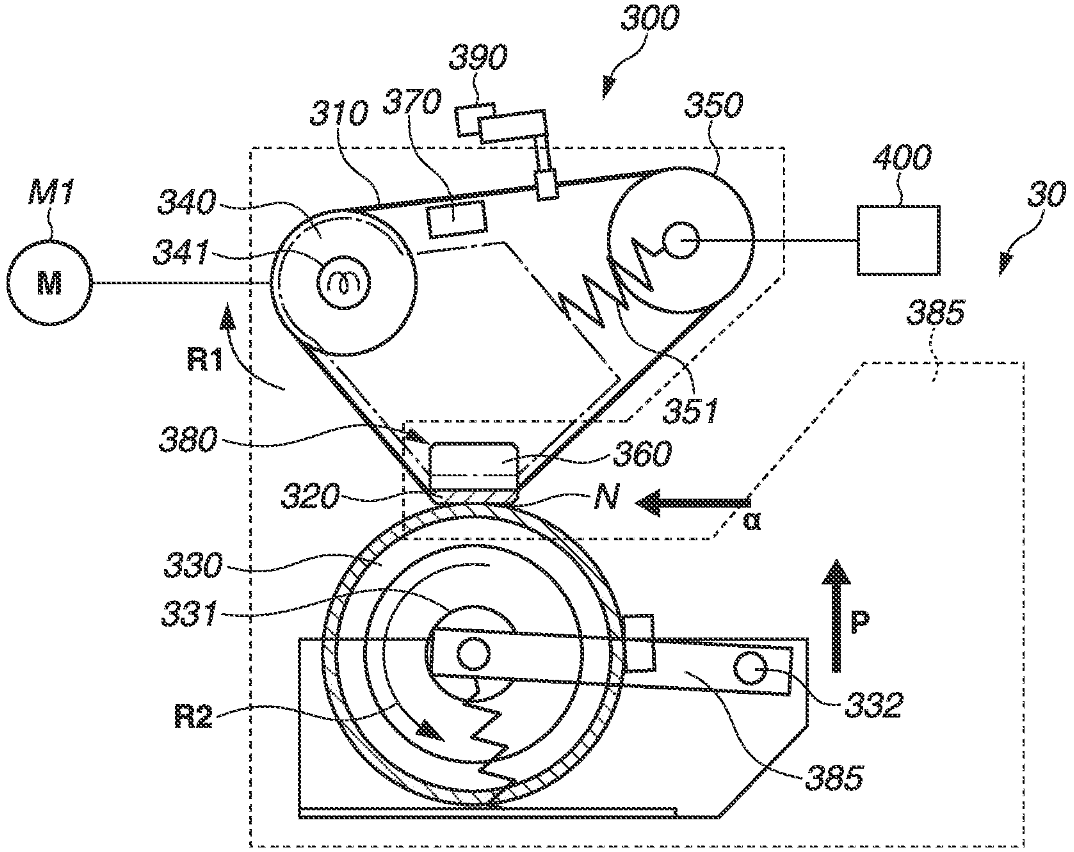
FIG. 2 is a schematic diagram of a cross section of a fixing device.
Figure 4:
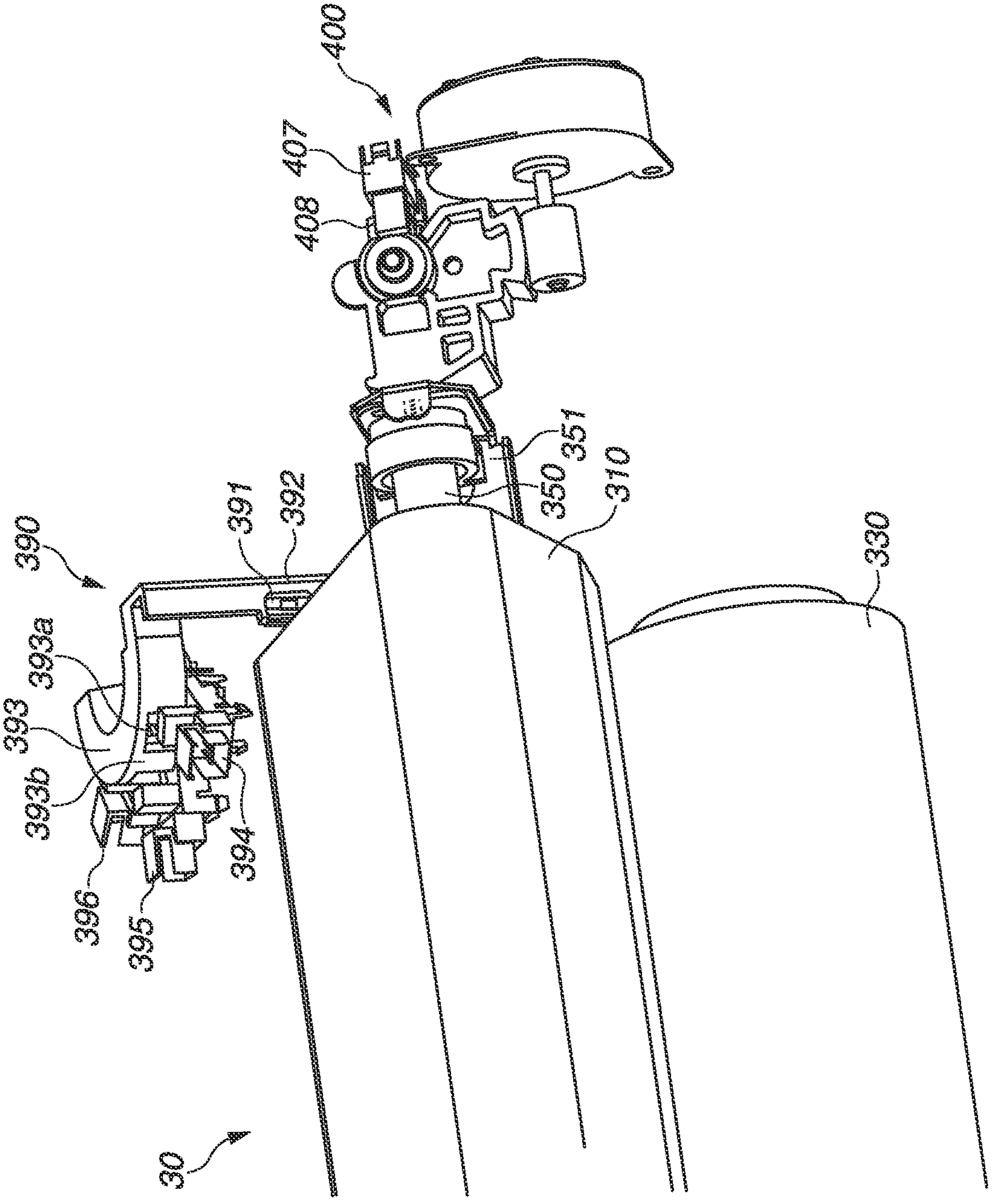
FIG. 4 is a schematic diagram illustrating a sensor unit that detects a position of a fixing belt.

With reference to FIGS. 2, 3, and 4, a description is given of a belt position detection unit for detecting the position of the fixing belt 310 in the width direction.

In the present exemplary embodiment, a sensor unit 390 that detects the position of an end portion of the fixing belt 310 in the width direction is provided. Based on output signals of the sensor unit 390, the position of the end portion of the fixing belt 310 is detected. The steering mechanism 400 is caused to operate based on the detected position of the end portion of the fixing belt 310, thereby changing the inclination angle of the steering roller 350. With reference to FIG. 4, the configuration of the sensor unit 390 will be described.

As illustrated in FIG. 4, the sensor unit 390 according to the present exemplary embodiment includes an abutment member 391 that abuts the end portion of the fixing belt 310, an arm member 392 that supports the abutment member 391, a belt position detection unit 393 as a movement member, and three sensors 394, 395, and 396 that detect the position of the end portion of the fixing belt 310. As each of the sensors 394, 395, and 396 used in the belt position detection unit 393, for example, an optical sensor is employed. The abutment member 391 is placed on one end side of the arm member 392 so that the abutment member 391 abuts the end portion in the width direction of the fixing belt 310.

The arm member 392 is biased from the end portion to a central portion of the fixing belt 310 in the width direction by a coil spring (not illustrated). The arm member 392 is rotatably provided to follow the movement in the width direction of the fixing belt 310 via the abutment member 391. On the other end side of the arm member 392, the belt position detection unit 393 as a movement member is provided. The belt position detection unit 393 is, for example, a fan-shaped column member. On an arc-shaped outer peripheral surface of the belt position detection unit 393, a plurality of opening portions 393*a* and a plurality of detection target portions 393*b* are formed. The three sensors 394, 395, and 396 are placed next to each other at predetermined distances along the rotational movement direction of the belt position detection unit 393 so that the three sensors 394, 395, and 396 are opposed to the outer peripheral surface of the belt position detection unit 393 on which the opening portions 393*a* and the detection target portions 393*b* are formed.

In the present exemplary embodiment, when the fixing belt 310 moves from one end side to the other end side in the width direction, the belt position detection unit 393 rotationally moves along with the movement of the fixing belt 310. The positional relationships between the sensors 394, 395, and 396 and the detection target portions 393*b* (or the opening portions 393*a*) change according to the rotational movement of the belt position detection unit 393. Specifically, a switch is made between a detection state where the sensors 394, 395, and 396 detect the detection target portions 393*b* and a non-detection state where the sensors 394, 395, and 396 are opposed to the opening portions 393*a* and therefore do not detect the detection target portions 393*b*.

In the present exemplary embodiment, an optical sensor is used as each of the sensors 394, 395, and 396. Each of the sensors 394, 395, and 396 includes a light-emitting unit that emits light and a light-receiving unit that receives reflected light of the light emitted from the light-emitting unit. Each of the sensors 394, 395, and 396 causes the light-emitting unit to emit light of a predetermined amount toward the belt position detection unit 393. If the emitted light is blocked by the detection target portions 393*b* of the belt position detection unit 393, the light-receiving unit included in each of the sensors 394, 395, and 396 does not receive the light emitted from the light-emitting unit. If, on the other hand, the emitted light is not blocked by the opening portions 393*a* of the belt position detection unit 393, the light-receiving unit receives the light emitted from the light-emitting unit. As described above, it is determined whether each of the sensors 394, 395, and 396 receives light according to the movement of the belt position detection unit 393.

<Control Unit>

Figure 5:
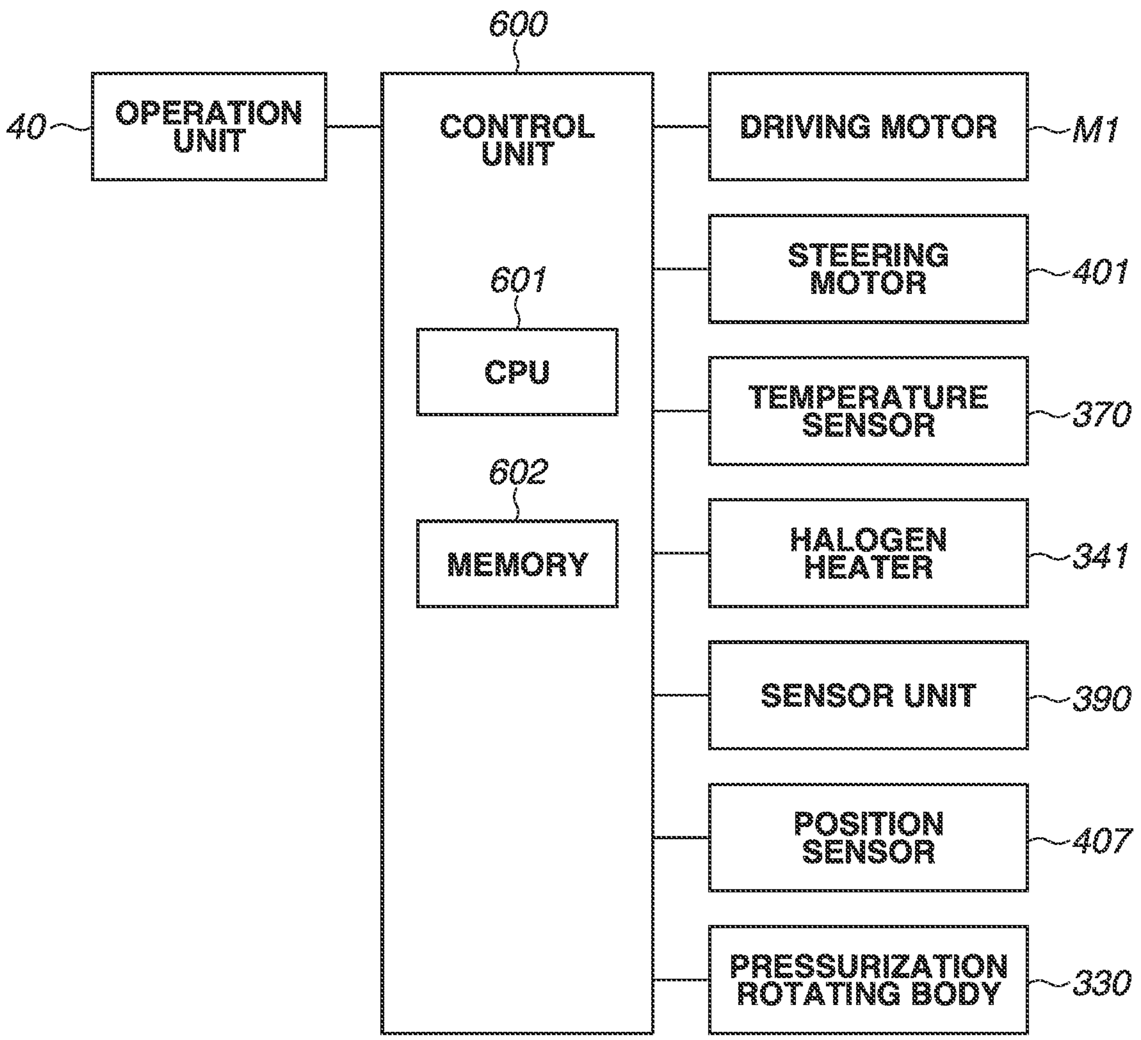
FIG. 5 is a block diagram illustrating a control unit.

As illustrated in FIG. 1, the image forming apparatus 100 includes the control unit 600. With reference to FIG. 5 in addition to FIGS. 2 to 4, the control unit 600 will be described. Various devices such as a motor and a power supply for causing the image forming apparatus 100 to operate are also connected to the control unit 600 in addition to illustrated components. These various devices, however, are not a main aspect of the disclosure, and therefore are not illustrated or described here.

The control unit 600 as a control unit performs various types of control, such as control of an image forming operation, and includes, for example, a central processing unit (CPU) 601 and a memory 602. The memory 602 is composed of a read-only memory (ROM) and a random-access memory (RAM). The memory 602 stores various programs and various types of data for controlling the image forming apparatus 100. The CPU 601 can execute the various programs stored in the memory 602. The CPU 601 can execute the various programs to cause the image forming apparatus 100 to operate.

In the present exemplary embodiment, the CPU 601 can execute an "image forming job process (program)" stored in the memory 602 and "steering control".

The memory 602 stores, for example, a "sensor value table" (see FIG. 9) which is referenced to identify the position of the end portion of the fixing belt 310 reciprocated by the steering control in a belt deviation control process, or determine the presence or absence of the failure of the sensor unit 390. The memory 602 can also temporarily store a calculation process result obtained by the execution of various programs.

An operation unit 40 is connected via an input/output interface to the control unit 600. The operation unit 40 includes, for example, a touch panel-type liquid crystal screen (a display unit) so that a user can give an instruction to start various programs for an image forming job process, or can input various types of data such as the size (A3 or B4) of a recording material.

The liquid crystal screen can display various screens including a software key. Various functions such as an instruction to start various programs assigned in advance according to a touch operation on the software key by the user can be executed. The liquid crystal screen can also display various types of information such as the operating state of the image forming apparatus 100 and error information to inform the user of the various types of information. That is, in the present exemplary embodiment, the operation unit 40 can function as an informing unit. The method for informing the user of the various types of information such as the error information is not limited to an informing method using display as described above, and may be an appropriate method such as an informing method using sound by a sound generation unit such as a loudspeaker.

The length of the recording material in the conveying direction can also be input via the operation unit 40. Information regarding the length of the recording material in the conveying direction input via the operation unit 40 is sent to the control unit 600. Based on the sent information, the steering control is changed according to the length of the recording material in the conveying direction. The information regarding the length of the recording material in the conveying direction sent to the control unit 600 is not only information input via the operation unit 40. For example, the information regarding the length of the recording material in the conveying direction may be calculated based on the conveying time of the sheet from the leading edge to the trailing edge of the sheet and the conveying speed of the recording material using a recording material presence/absence detection sensor (not illustrated).

Further, the driving motor M1, the steering motor 401, a temperature sensor 370, the halogen heater 341, the sensor unit 390, a position sensor 407, and a motor that drives the pressurization rotating member 330 are connected to the control unit 600 via an input/output interface. If an instruction to start an image forming job is given via the operation unit 40, the control unit 600 (specifically, the CPU 601) executes the "image forming job" stored in the memory 602. Based on the execution of the "image forming job", the control unit 600 controls the image forming apparatus 100. Accordingly, the control unit 600 drives the driving motor M1 to rotate the heating roller 340, thereby rotating the fixing belt 310. The control unit 600 also controls the halogen heater 341 based on the detection result of the temperature sensor 370 so that the surface temperature of the fixing belt 310 is a desired target temperature (180° C. in the present exemplary embodiment). The control unit 600 controls the motor that drives the pressurization rotating member 330, and therefore can also determine whether the pressurization rotating member 330 abuts or is separate from the fixing belt 310.

Figures 6A, 6B:
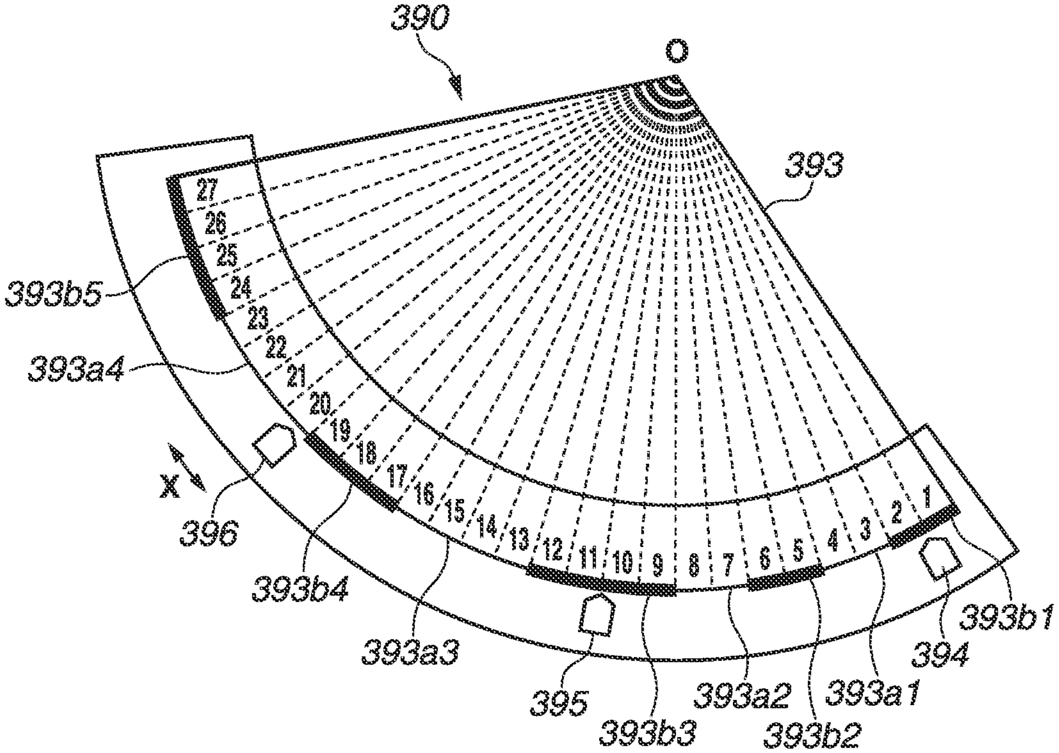
FIGS. 6A and 6B are schematic diagrams illustrating a belt position detection unit that detects the position of the fixing belt.

In the present exemplary embodiment, the control unit 600 controls the steering motor 401 based on the detection result of the sensor unit 390, specifically, based on the combinations of output signals of the three sensors 394, 395, and 396 (see FIG. 6B). That is, the control unit 600 detects the position of the end portion of the fixing belt 310 based on the detection result of the sensor unit 390, and rotates the steering motor 401 forward or backward according to the amount of rotation obtained from the detected position. In this manner, the control unit 600 causes the steering motor 401 to operate the steering mechanism 400, thereby enabling the steering control of the fixing belt 310.

<Belt Position Detection Unit>

The belt position detection unit 393 will be described with reference to FIGS. 6A and 6B. FIG. 6A is a top view illustrating the belt position detection unit 393. FIG. 6B illustrates the combinations of output signals of the sensors 394, 395, and 396 in a case where the belt position detection unit 393 is used. FIG. 6A illustrates a configuration in which 27 areas are used in a case where the three sensors (394, 395, and 396) detect nine positions on the fixing belt 310 in the width direction. For example, in a case where the sensors 394, 395, and 396 are in a detection state where the sensors 394, 395, and 396 detect detection target portions 393*b*1 to 393*b*5, i.e., a blocked state where the sensors 394, 395, and 396 are blocked by the detection target portions 393*b*1 to 393*b*5, the sensors 394, 395, and 396 put out output signals "0". On the other hand, in a case where the sensors 394, 395, and 396 are in a non-detection state where the sensors 394, 395, and 396 do not detect the detection target portions 393*b*1 to 393*b*5, i.e., an opened state (also referred to as a "non-blocked state") where the sensors 394, 395, and 396 are opposed to opening portions 393*a*1 to 393*a*4, the sensors 394, 395, and 396 put out output signals "1".

In FIG. 6B, "first sensor" indicates the sensor 394, "second sensor" indicates the sensor 395, and "third sensor" indicates the sensor 396. "Belt position" is a value determined based on the combinations of the output signals of the sensors 394, 395, and 396. In the present exemplary embodiment, the control unit 600 can detect the position of the end portion of the fixing belt 310 at nine positions into which the position of the end portion of the fixing belt 310 is subdivided according to the value of "belt position" determined according to the combinations of the output signals (0 or 1) of the sensors 394, 395, and 396.

Figure 7:
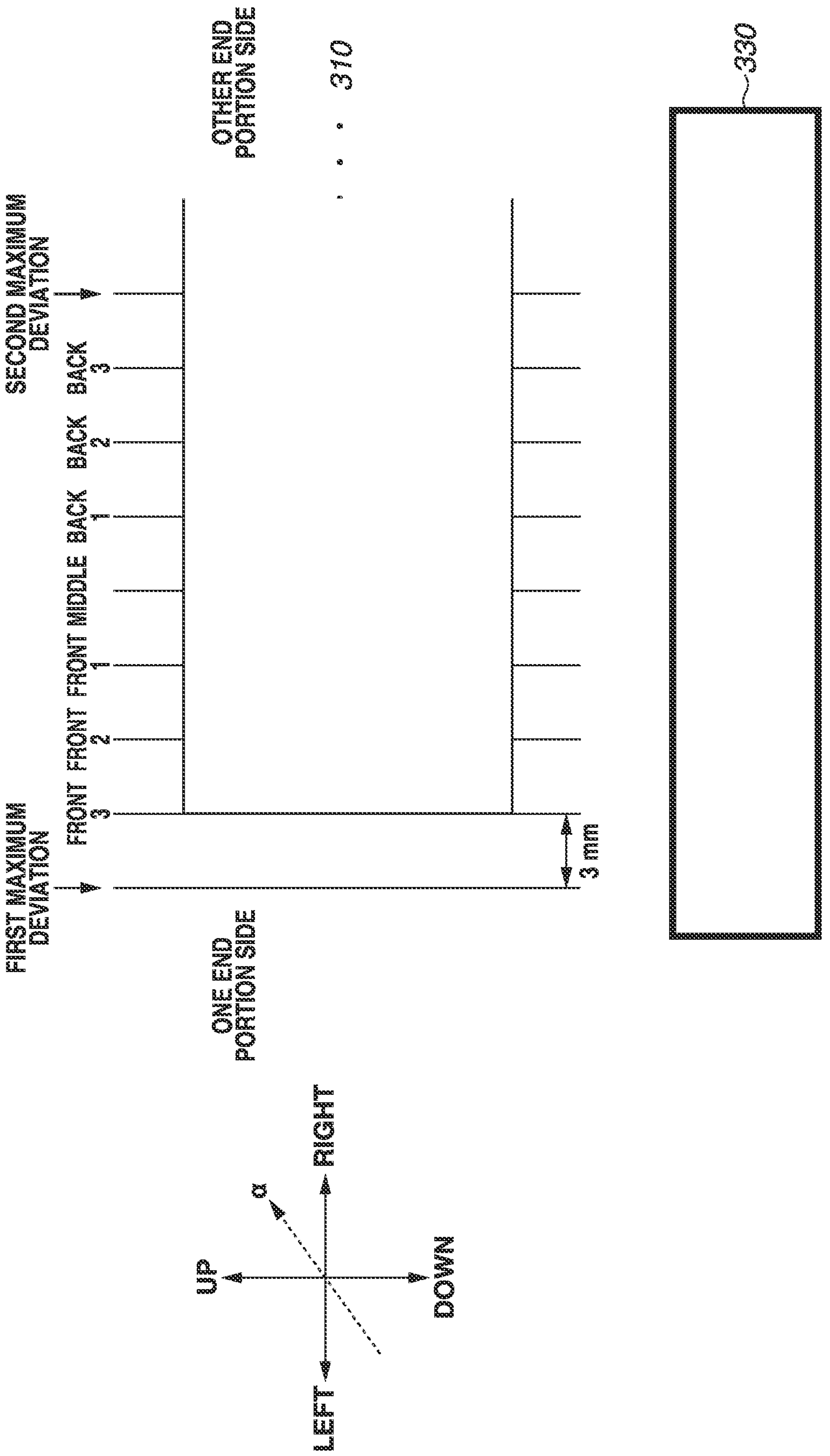
FIG. 7 is a schematic diagram illustrating the position of the fixing belt in a width direction on one end portion side of the fixing belt.

With reference to FIG. 7, a description will be given of the nine positions into which the position of the end portion of the fixing belt 310 is subdivided. FIG. 7 is a diagram illustrating one end portion side of the fixing belt 310 from the conveying direction a such that the pressurization rotating member 330 is located on the lower side. Positions that can be detected are a "first maximum deviation" position where the fixing belt 310 is moved to the maximum on the one end side, a "second maximum deviation" position where the fixing belt 310 is moved to the maximum on the other end side, and seven positions into which the portion between the "first maximum deviation" position and the "second maximum deviation" position is equally subdivided. These seven positions are a "front 3" position, a "front 2" position, a "front 1" position, a "middle" position, a "back 1" position, a "back 2" position, and a "back 3" position in this order from the "first maximum deviation" position side. "Front" and "back" positions are defined such that in the image forming apparatus 100, the side where the operation unit 40 is provided is a "front" side, and the opposite side is a "back" side.

In the present exemplary embodiment, the detection target portions 393*b*1 to 393*b*5 are placed so that two or more of the sensors 394, 395, and 396 are simultaneously in the detection state (0) or the non-detection state (1) according to the movement position of the belt position detection unit (sensor flag) 393. The detection target portions 393*b*1 to 393*b*5 are also placed so that in a state where the fixing belt 310 is at the "first maximum deviation" position or the "second maximum deviation" position, all the sensors 394, 395, and 396 are in the detection state (or the non-detection state).

In the present exemplary embodiment, the "front 3" position is a first predetermined position, and the "front 1" position is a second predetermined position. The "front 1" position is located on the "middle" position side with respect to the "front 3" position.

If the fixing belt 310 is located at the "middle" position, this indicates that the center position of the fixing belt 310 is at the center position of the steering roller 350 in the width direction. If the fixing belt 310 is located at the "front 1", "front 2", or "front 3" position, this indicates that the center position of the fixing belt 310 is located further on the one end portion side than the center position of the steering roller 350 in the width direction. Conversely, if the fixing belt 310 is located at the "back 1", "back 2", or "back 3" position, this indicates that the center position of the fixing belt 310 is located further on the other end portion side than the center position of the steering roller 350 in the width direction. Thus, if the belt position detection unit 393 detects that the fixing belt 310 is located at the second predetermined position in the width direction, this indicates that the fixing belt 310 is located further on the central position side of the steering roller 350 than in a case where the fixing belt 310 is located at the first predetermined position.

The center position of the fixing belt 310 and the center position of the steering roller 350 may be somewhat shifted due to variation in assembly accuracy.

FIG. 7 illustrates the nine positions from the first maximum deviation position to the second maximum deviation position. The nine positions are arranged at equal distances, and each distance in the present exemplary embodiment is 3 mm (see FIG. 7). In the present exemplary embodiment, the first maximum deviation position is on one end portion side of the steering roller 350. The "middle" position is the central position of the nine positions arranged at equal distances. Thus, if the belt position detection unit 393 detects that the end portion of the fixing belt 310 is located at the "middle" position, this means that the fixing belt 310 is located at the central position of the steering roller 350 in the width direction.

As illustrated in FIG. 6A, the sensor flag 393 is a fan-shaped column member. The sensors 394, 395, and 396 are placed opposed to the outer peripheral surface of the sensor flag 393, and the five detection target portions 393*b*1 to 393*b*5 are formed on the outer peripheral surface. In other words, the four opening portions 393*a*1 to 393*a*4 are formed on the outer peripheral surface to form the five detection target portions 393*b*1 to 393*b*5. In the present exemplary embodiment, the three sensors 394, 395, and 396 are placed next to each other at predetermined distances along the moving direction of the sensor flag 393 (the direction of an arrow X). The number of detection target portions to be formed only needs to be four or more, which is greater than the number of sensors.

In the sensor flag 393, the five detection target portions 393*b*1 to 393*b*5 are formed so that the detection state and the non-detection state are switched in any one of the sensors 394, 395, and 396 in response to the movement of the sensor flag 393. That is, the detection target portions 393*b*1 to 393*b*5 are formed so that when the fixing belt 310 moves in the width direction, only one of the output signals of the sensors 394, 395, and 396 changes as illustrated in FIG. 6B. For example, in a case where the sensor flag 393 is divided into 27 areas by equal angles in its circumferential direction about its pivotal center O, the detection target portions 393*b*1 to 393*b*5 are formed with widths as illustrated in FIG. 6A. Specifically, the detection target portions 393*b*1 to 393*b*5 are formed so that the detection target portions 393*b*1 and 393*b*2 each occupy two areas, the detection target portions 393*b*3 and 393*b*5 each occupy four areas, and the detection target portion 393*b*4 occupies three areas.

As illustrated in FIG. 6B, in a case where the sensor flag 393 illustrated in FIG. 6A is used, and if the fixing belt 310 (specifically, the position of the end portion of the fixing belt 310) is at the "second maximum deviation" position, all the output signals of the three sensors 394, 395, and 396 indicate "0". That is, the three sensors 394, 395, and 396 are in a detection state where the three sensors 394, 395, and 396 detect the detection target portions 393*b*1, 393*b*3, and 393*b*4, respectively. Then, if the fixing belt 310 moves from the "second maximum deviation" position to the "back 3" position, the output signal of the sensor 396 changes from "0" to "1", and the output signals of the other sensors 394 and 395 do not change from "0". That is, only the output signal of the sensor 396 changes. At this time, the sensor 396 is opposed to the opening portion 393*a*4.

If the fixing belt 310 moves from the "back 3" position to the "back 2" position, only the output signal of the sensor 394 changes from "0" to "1". At this time, the sensor 394 is opposed to the opening portion 393_a_1. If the fixing belt 310 moves from the "back 2" position to the "back 1" position, only the output signal of the sensor 395 changes from "0" to "1". At this time, the sensor 395 is opposed to the opening portion 393_a_3. That is, all the three sensors 394, 395, and 396 are in a non-detection state where the three sensors 394, 395, and 396 are opposed to the opening portions 393_a_1, 393_a_3, and 393_a_4, respectively, and do not detect any of the detection target portions 393_b_1 to 393_b_5. Thus, all the output signals of the three sensors 394, 395, and 396 indicate "1".

Then, if the fixing belt 310 moves from the "back 1" position to the "middle" position, only the output signal of the sensor 394 changes from "1" to "0". At this time, the sensor 394 detects the detection target portion 393_b_2. If the fixing belt 310 moves from the "middle" position to the "front 1" position, only the output signal of the sensor 396 changes from "1" to "0". At this time, the sensor 396 detects the detection target portion 393_b_5. If the fixing belt 310 moves from the "front 1" position to the "front 2" position, only the output signal of the sensor 394 changes from "0" to "1". At this time, the sensor 394 is opposed to the opening portion 393_a_2. If the fixing belt 310 moves from the "front 2" position to the "front 3" position, only the output signal of the sensor 395 changes from "1" to "0". At this time, the sensor 395 detects the detection target portion 393_b_4. Further, if the fixing belt 310 moves from the "front 3" position to the "first maximum deviation" position, only the output signal of the sensor 394 changes from "1" to "0". At this time, the sensor 394 detects the detection target portion 393_b_3. When the fixing belt 310 is at the "first maximum deviation" position, the output signals of all the sensors 394, 395, and 396 indicate "0". That is, the three sensors 394, 395, and 396 are in a detection state where all the three sensors 394, 395, and 396 detect the detection target portions 393_b_3, 393_b_4, and 393_b_5, respectively. In a case where the fixing belt 310 moves from the "first maximum deviation" position to the "second maximum deviation" position, the changes in the output signals of the sensors 394, 395, and 396 only need to be reversed, and therefore, this case will not be described here.

To prevent the fixing belt 310 from coming off the steering roller 350, if the belt position detection unit 393 detects that the fixing belt 310 is located at the "first maximum deviation" position or the "second maximum deviation" position, the control unit 600 determines via the sensor unit 390 that a maximum deviation error has occurred. If the control unit 600 determines that the maximum deviation error has occurred, the image forming process is stopped, and the pressurization rotating member 330 enters the separated state. To notify the user that the maximum deviation error has occurred, the operation unit 40 may display that the maximum deviation error has occurred. When the pressurization rotating member 330 enters the separated state, a serviceman can easily perform the work of restoring the image forming apparatus 100 from the maximum deviation error to the state where the image forming apparatus 100 can form an image.

In the present exemplary embodiment, this work is the work of moving the fixing belt 310 further to the "middle" position side than the "first maximum deviation" position or the "second maximum deviation" position.

In the present exemplary embodiment, a description has been given of the method in which the belt position detection unit 393 and the sensors 394, 395, and 396 detect the position in the width direction. The method for detecting the position in the width direction of the belt is not limited to this. Alternatively, a line sensor or an eddy current sensor may be used.

<Steering Control in Case where Recording Material Having Length Less than or Equal to Predetermined Length is Conveyed to Fixing Nip Portion N According to First Exemplary Embodiment>

A description will be given below of the details of steering control for a case where a recording material having a length less than or equal to a predetermined length is conveyed to the fixing nip N. The predetermined length has a value smaller than that of the length between the fixing nip portion N and the transfer nip portion n2 in the conveying direction. The length between the fixing nip N and the transfer nip n2 according to the present exemplary embodiment is 1000 mm. The predetermined length is 500 mm. As described above, the predetermined length has a value smaller than that of the length between the fixing nip portion N and the transfer nip portion n2.

In a case where the fixing device 30 applies heat and pressure to a recording material bearing an unfixed toner image, thereby fixing the unfixed toner image to the recording material, the pressurization rotating member 330 enters the abutment state where the pressurization rotating member 330 abuts the fixing belt 310 to form the fixing nip N. In the abutment state, the pressurization rotating member 330 presses the fixing pad 380 with a force of 2000 N via the fixing belt 310. Thus, a paper edge scratch occurs on the surface of the fixing belt 310. When the paper edge scratch is formed on the surface of the fixing belt 310, uneven gloss occurs such that a line is drawn on the surface of the image. Accordingly, in a case where a recording material having a length less than or equal to the predetermined length is conveyed to the fixing nip portion N, the steering mechanism 400 performs steering control for reciprocating the fixing belt 310 in the width direction to prevent the deterioration of the surface of the fixing belt 310 due to a paper edge scratch.

In the steering control for a case where a recording material having a length less than or equal to the predetermined length is conveyed to the fixing nip portion N according to a first exemplary embodiment, the operation of inclining the steering roller 350 is performed at two positions on the fixing belt 310. The range of the reciprocation of the fixing belt 310 is between the "front 3" and "back 3" positions.

The inclination angle at which the steering roller 350 is inclined is made greater in a case where a recording material having a length less than or equal to the predetermined length is conveyed to the fixing nip portion N than in a case where a recording material having a length greater than the predetermined length is conveyed to the fixing nip portion N, thereby making the moving speed in the width direction of the fixing belt 310 great. The greater the moving speed of the fixing belt 310 in the width direction is, the more an edge portion of the recording material tends to be prevented from repeatedly passing through the same area on the surface of the fixing belt 310. Thus, it is possible to prevent the deterioration of the surface of the fixing belt 310 due to a paper edge scratch.

Figure 8:
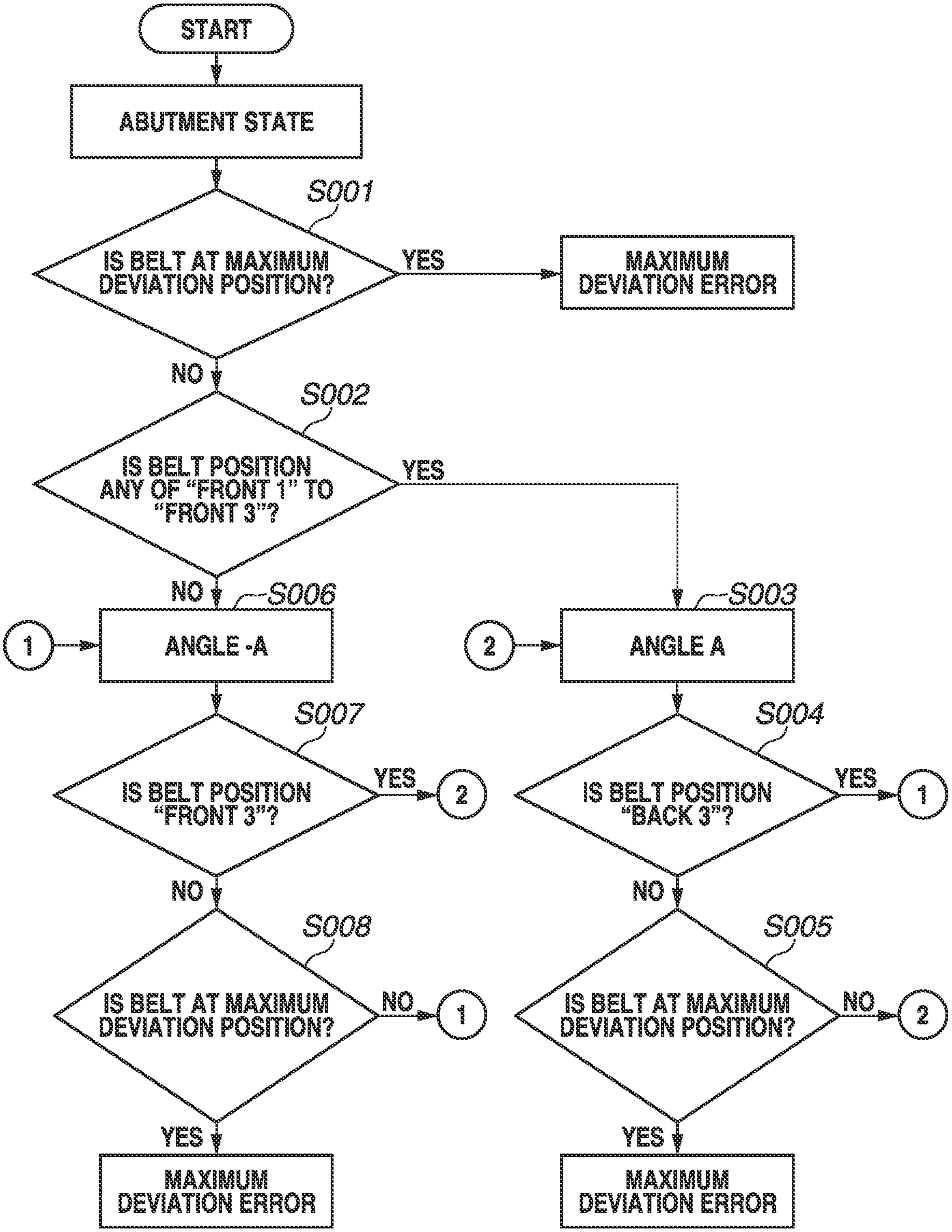
FIG. 8 is a flowchart illustrating steering control for a case where a recording material having a length less than or equal to a predetermined length is conveyed to a fixing nip portion.
Figure 9:
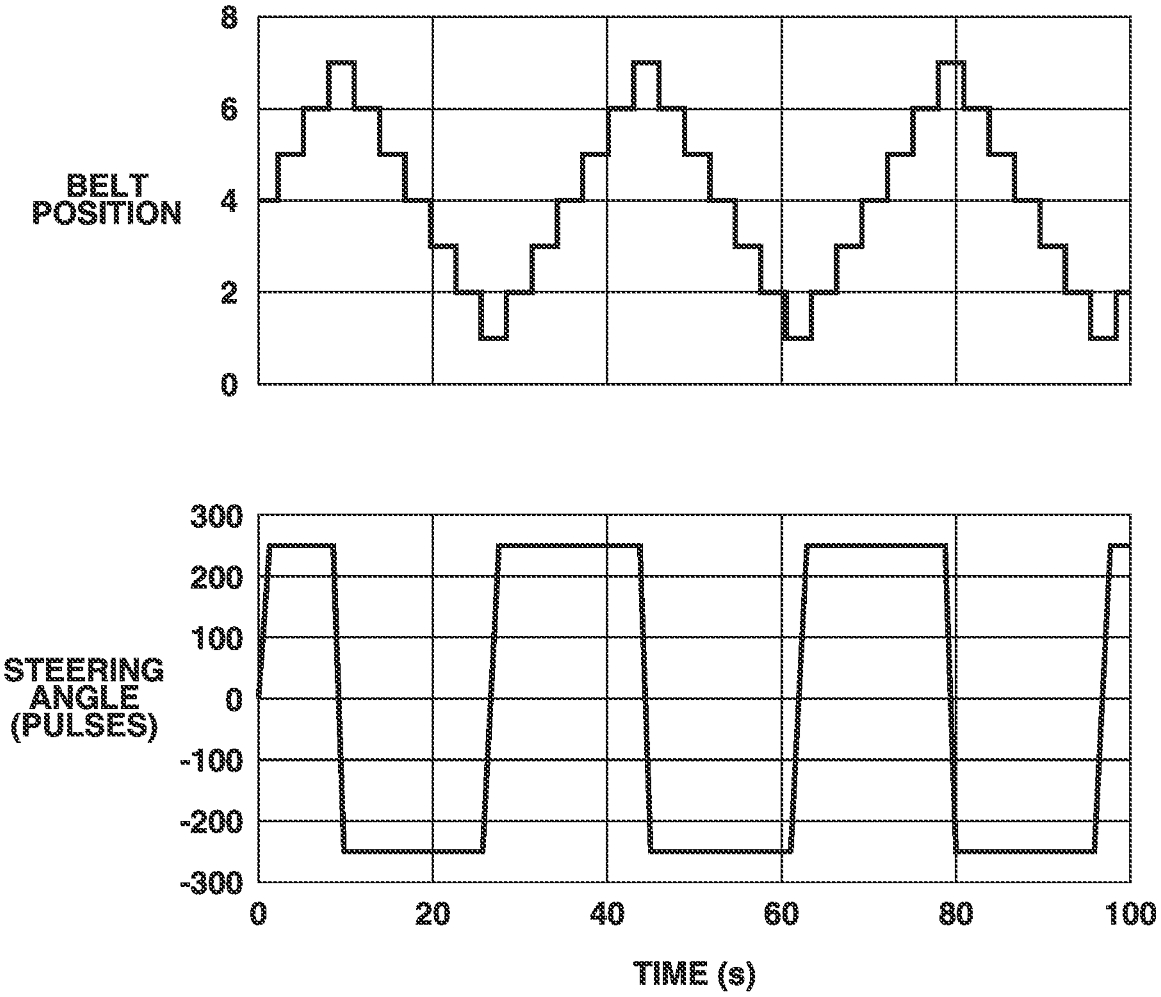
FIG. 9 is a diagram illustrating a relationship between the position of the fixing belt and an inclination angle of a steering roller in a case where a recording material having a length less than or equal to the predetermined length is conveyed to the fixing nip portion.
Figure 10:
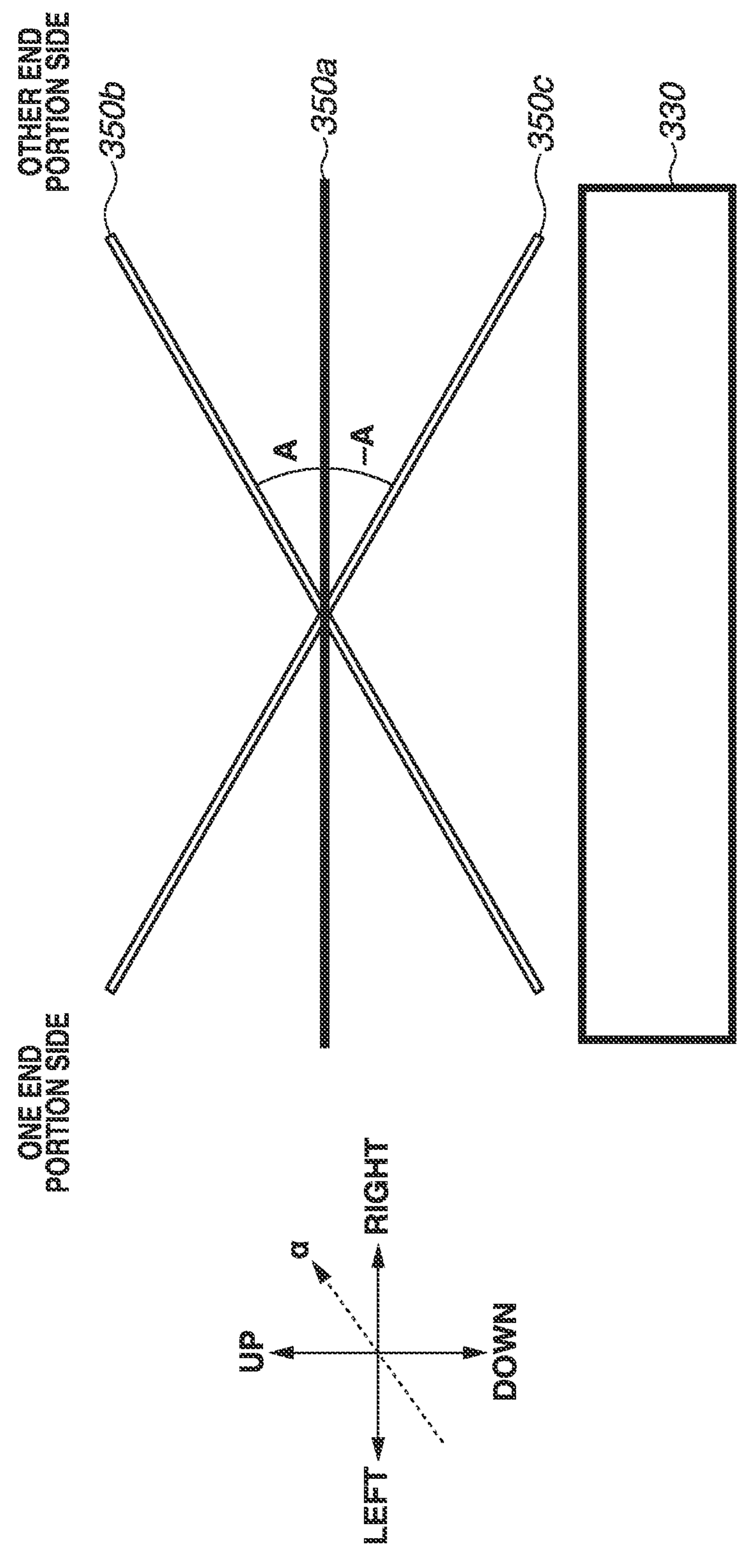
FIG. 10 is a diagram illustrating inclination angles (A and −A) of the steering roller.

With reference to FIGS. 8, 9, and 10, a description will be given below of the details of the steering control by the steering mechanism 400 in a case where a recording material having a length less than or equal to the predetermined length is conveyed to the fixing nip portion N.

In a case where a recording material having a length less than or equal to the predetermined length is conveyed to the fixing nip portion N, then, as illustrated in FIG. 8, the steering control is performed by inclining the steering roller 350 according to the position of the fixing belt 310.

A description will be given with reference to a flowchart in FIG. 8.

First, the control unit 600 determines that a recording material having a length less than or equal to the predetermined length is conveyed to the fixing nip portion N.

In step S001, the belt position detection unit 393 detects the position of the fixing belt 310 for the first time. If the belt position detection unit 393 detects that the fixing belt 310 is located at the first maximum deviation position or the second maximum deviation position (a maximum deviation position) (YES in step S001), the control unit 600 indicates a maximum deviation error.

If it is detected that the fixing belt 310 is not located at the maximum deviation position (NO in step S001), the processing proceeds to step S002.

In step S002, if the belt position detection unit 393 detects in the first detection that the fixing belt 310 is located at the "front 1", "front 2", or "front 3" position (YES in step S002), the processing proceeds to step S003. If the belt position detection unit 393 detects in the first detection that the fixing belt 310 is located at the "middle", "back 1", "back 2", or "back 3" position (NO in step S002), the processing proceeds to step S006.

In step S003, the operation of inclining the steering roller 350 at a first inclination angle is performed by the steering control.

The first inclination angle will be described with reference to FIG. 10. FIG. 10 is a diagram viewed from the direction of the arrow α in FIG. 2. FIG. 10 does not illustrate the fixing belt 310 to describe the inclination angle of the steering roller 350. The pressurization rotating member 330 is located on the lower side of the plane of the paper. In FIG. 10, a steering roller 350*a* indicates the state where the steering roller 350 is parallel to the heating roller 340. The first inclination angle is the angle at which the steering roller 350 is inclined with respect to the steering roller 350*a* for the purpose of moving the fixing belt 310 to the other end portion side of the steering roller 350. In the present exemplary embodiment, the operation of inclining the steering roller 350*a* counterclockwise with respect to the plane of the paper in FIG. 10 to the position of a steering roller 350*b* is performed. The direction in which the steering roller 350*a* is inclined counterclockwise with respect to the plane of the paper is a first direction. As a result, the fixing belt 310 is moved to the other end portion side of the steering roller 350. The inclination angle from the steering roller 350*a* to the steering roller 350*b* at this time is the first inclination angle (an angle A). Although the steering roller 350*a* according to the present exemplary embodiment indicates the state where the steering roller 350 is parallel to the heating roller 340, some shift in the position of the steering roller 350 due to variation in assembly accuracy is permissible.

As a result of performing the operation of inclining the steering roller 350*a* to the position of the steering roller 350*b*, the steering roller 350 is inclined at the first inclination angle.

It takes approximately 1.5 seconds to change the inclination angle of the steering roller 350. Thus, there is a case where the fixing belt 310 goes beyond the "front 3" position to the first maximum deviation position side (overshoot). If the belt position detection unit 393 detects that the fixing belt 310 reaches the first maximum deviation position and is located at the first maximum deviation position, the control unit 600 indicates a maximum deviation error.

On the other hand, a case is also possible where the fixing belt 310 reaches a position beyond the "front 3" position on the first maximum deviation position side but does not reach the first maximum deviation position. In this case, the steering roller 350 is inclined at the first inclination angle, thereby moving the fixing belt 310 from the position between the "front 3" position and the first maximum deviation position to the other end portion side of the steering roller 350. Consequently, the belt position detection unit 393 detects that the fixing belt 310 is located at the "front 3" position, but the inclination angle of the steering roller 350 is the first inclination angle A in the first direction.

Since the steering roller 350 is inclined at the first inclination angle, the fixing belt 310 is moved to the "front 2" position, the "front 1" position (the second predetermined position), the "middle" position, the "back 1" position, and the "back 2" position in this order. While the fixing belt 310 is moved to the other end portion side, the belt position detection unit 393 detects the position of the fixing belt 310 at the "front 2" position, the "front 1" position (the second predetermined position), the "middle" position, the "back 1" position, and the "back 2" position, but the operation of changing the inclination angle of the steering roller 350 by the steering control is not performed. The steering roller 350 is inclined at the first inclination angle.

Alternatively, a configuration may be employed in which the belt position detection unit 393 does not detect that the fixing belt 310 is located at the "front 2" position, the "front 1" position (the second predetermined position), the "middle" position, the "back 1" position, and the "back 2" position, and the operation of inclining the steering roller 350 by the steering control is not performed.

In step S004, if the fixing belt 310 is moved to the other end portion side of the steering roller 350 and the belt position detection unit 393 detects that the fixing belt 310 is located at the "back 3" position (YES in step S004), the processing proceeds to step S006. If the belt position detection unit 393 does not detect that the fixing belt 310 is located at the "back 3" position (NO in step S004), the processing proceeds to step S005.

In step S005, if it is detected that the fixing belt 310 is located at the maximum deviation position (YES in step S005), the control unit 600 indicates a maximum deviation error. If it is not detected that the fixing belt 310 is located at the maximum deviation position (NO in step S005), the processing returns to step S003.

In step S006, the operation of inclining the steering roller 350 at an angle −A for the purpose of moving the fixing belt 310 to the one end portion side is performed by the steering control by the steering mechanism 400.

In FIG. 10, the steering roller 350*a* indicates the state where the steering roller 350 is parallel to the heating roller 340. The angle −A is the angle at which the steering roller 350 is inclined with respect to the steering roller 350*a* for the purpose of moving the fixing belt 310 to the one end portion side of the steering roller 350. In the present exemplary embodiment, the operation of inclining the steering roller 350*a* clockwise with respect to the plane of the paper in FIG. 10 to the position of a steering roller 350*c* is performed. The direction in which the steering roller 350*a* is inclined clockwise with respect to the plane of the paper is a second direction. That is, the second direction is the direction in which the steering roller 350*a* is inclined clockwise, which is opposite to the first direction in which the steering roller 350*a* is inclined counterclockwise with respect to the plane of the paper. As a result, the fixing belt 310 is moved to the one end portion side of the steering roller 350. The inclination angle from the steering roller 350*a* to the steering roller 350*c* at this time is the angle −A.

As a result of performing the operation of inclining the steering roller 350*a* to the position of the steering roller 350*c*, the steering roller 350 is inclined at the angle −A.

It takes approximately 1.5 seconds to change the inclination angle of the steering roller 350. Thus, there is a case where the fixing belt 310 goes beyond the "back 3" position to the second maximum deviation position side (overshoot). If the belt position detection unit 393 detects that the fixing belt 310 reaches the second maximum deviation position and is located at the second maximum deviation position, the control unit 600 indicates a maximum deviation error.

On the other hand, a case is also possible where the fixing belt 310 reaches a position beyond the "back 3" position on the second maximum deviation position side but does not reach the second maximum deviation position. In this case, the steering roller 350 is inclined at the angle −A, thereby moving the fixing belt 310 from the position between the "back 3" position and the second maximum deviation position to the one end portion side of the steering roller 350. Consequently, the belt position detection unit 393 detects that the fixing belt 310 is located at the "back 3" position, but the inclination angle of the steering roller 350 is the angle −A.

Since the steering roller 350 is inclined at the angle −A, the fixing belt 310 is moved to the "back 2" position, the "back 1" position, the "middle" position, the "front 1" position (the second predetermined position), and the "front 2" position in this order. While the fixing belt 310 is moved to the one end portion side, the belt position detection unit 393 detects the position of the fixing belt 310 at the "back 2" position, the "back 1" position, the "middle" position, the "front 1" position (the second predetermined position), and the "front 2" position, but the operation of inclining the steering roller 350 by the steering control is not performed. The steering roller 350 is inclined at the angle −A.

Alternatively, a configuration may be employed in which the belt position detection unit 393 does not detect that the fixing belt 310 is located at the "back 2", "back 1", "middle", "front 1", and "front 2" positions, and the operation of inclining the steering roller 350 by the steering control is not performed.

In step S007, if the fixing belt 310 is moved to the one end portion side of the steering roller 350 and the belt position detection unit 393 detects that the fixing belt 310 is located at the "front 3" position (the first predetermined position) (YES in step S007), the processing proceeds to step S003. If the belt position detection unit 393 does not detect that the fixing belt 310 is located at the "front 3" position (NO in step S007), the processing proceeds to step S008.

In step S008, if it is detected that the fixing belt 310 is located at the maximum deviation position (YES in step S008), the control unit 600 indicates a maximum deviation error. If it is not detected that the fixing belt 310 is located at the maximum deviation position (NO in step S008), the processing returns to step S006.

As illustrated in FIG. 10, in a case where a recording material having a length less than or equal to the predetermined length is conveyed to the fixing nip portion N, the steering roller 350 is inclined at the angle A or −A. The angle A or −A is greater than angles B, −B, C, and −C illustrated in FIGS. 11 and 12. It is possible to make the moving speed of the fixing belt 310 in the width direction greater when the inclination angle of the steering roller 350 is greater. The moving speed of the fixing belt 310 is greater, whereby it is possible to prevent an edge portion of the recording material from repeatedly passing through the same area in the fixing belt 310. Thus, it is possible to prevent the deterioration of the surface of the fixing belt 310 due to an edge scratch.

If the fixing belt 310 is located at the "front 1", "front 2", "back 1", or "back 2" position, the operation of inclining the steering roller 350 is not performed, whereby it is possible to move the fixing belt 310 in a wide range. If the fixing belt 310 is located at the "front 3" or "back 3" position, the operation of inclining the steering roller 350 is performed. Thus, the fixing belt 310 is reciprocated between the "front 3" position (the first predetermined position) and the "back 3" position. That is, in a range where a maximum deviation error does not occur in the width direction, it is possible to reciprocate the fixing belt 310 in a range wider than in a case where a recording material having a length greater than the predetermined length is conveyed to the fixing nip portion N. Thus, it is possible to prevent the deterioration of the surface of the fixing belt 310 due to a paper edge scratch.

In the above description, the steering control is performed at the "front 3" and "back 3" positions. Alternatively, the steering control may also be performed at the "front 2" and "back 2" positions. In this case, if the belt position detection unit 393 detects that the fixing belt 310 is located at the "front 2" position, the operation of inclining the steering roller 350 is performed. The position of the steering roller 350 at this time is inclined to the steering roller 350*a* side with respect to the steering roller 350*b*. Similarly, if the belt position detection unit 393 detects that the fixing belt 310 is located at the "back 2" position, the operation of inclining the steering roller 350 is performed. The position of the steering roller 350 at this time is inclined to the steering roller 350*a* side with respect to the steering roller 350*c*.

<Steering Control in Case where Recording Material Having Length Greater than Predetermined Length is Conveyed to Fixing Nip Portion N According to First Exemplary Embodiment>

In recent years, there are many opportunities where a recording material long in the conveying direction is used in a copying machine. For example, a recording material exceeding 1200 mm, which is longer than the width of a standard size sheet, namely 19 inches (482.6 mm), is used. Such a recording material is subjected to printing as a product. Thus, a high-grade product is required for a recording material long in the conveying direction.

If a recording material bearing unfixed toner is conveyed to the fixing nip portion N to fix the unfixed toner on the recording material, and the fixing belt 310 is moved in the width direction by inclining the steering roller 350, the recording material also moves in the width direction along with the movement of the fixing belt 310 in the width direction in some cases. Additionally, the recording material is conveyed while being suctioned by the pre-fixing conveying belt 25 upstream of the fixing nip portion N in the conveying direction, and the recording material to which the toner is fixed is nipped and conveyed by the sheet discharge roller pair 26 downstream of the fixing nip portion N. The recording material is fixed to the fixing nip portion N with strong pressure and also fixed, if weakly, to the pre-fixing conveying belt 25 and the sheet discharge roller pair 26. At this time, if the recording material moves along with the movement of the fixing belt 310 in the width direction, the recording material gets twisted, and wrinkles occur.

The greater the length of a recording material in the conveying direction is, the greater the movement in the width direction of the recording material tends to be. Thus, if a long sheet, demand for which in printing has increased in recent years, is conveyed to the fixing nip portion N, the amount of movement of the long sheet in the width direction becomes great, and the risk of the occurrence of wrinkles increases. Accordingly, in a case where printing is performed on a recording material long in the conveying direction, the inclination angle of the steering roller 350 is made gentle, thereby reducing the movement of the fixing belt 310 in the width direction. This prevents the movement of a recording material long in the conveying direction in the width direction and reduces the occurrence of wrinkles.

A description will be given below of a detailed control method for controlling the steering roller 350 in a case where a recording material long in the conveying direction is conveyed to the fixing nip portion N.

The "recording material long in the conveying direction" refers to a recording material having a length greater than the predetermined length in the conveying direction. The predetermined length has a value smaller than that of the length between the fixing nip portion N and the transfer nip portion n2 in the conveying direction. The length between the fixing nip portion N and the transfer nip portion n2 according to the present exemplary embodiment is 1000 mm. The predetermined length is 500 mm. As described above, the predetermined length has a value smaller than that of the length between the fixing nip portion N and the transfer nip portion n2.

If a recording material having a length greater than the length between the fixing nip portion N and the transfer nip portion n2 in the conveying direction reaches the fixing nip portion N, the recording material is nipped in the fixing nip portion N and the transfer nip portion n2. If the recording material moves in the fixing nip portion N in the width direction, the recording material also moves in the transfer nip portion n2. In the transfer nip portion n2, a toner image is transferred, and a position on the recording material to which toner is to be transferred is shifted from a desired transfer position by an amount corresponding to the movement of the recording material in the width direction. In response, the predetermined length is made smaller than the length between the fixing nip N and the transfer nip n2. In a case where a recording material having a length greater than the predetermined length is conveyed to the fixing nip portion N, it is possible to prevent the movement of the recording material in the width direction that occurs in the transfer nip portion n2. Thus, it is possible to prevent a transfer shift.

The belt position detection unit 393 detects the position of the fixing belt 310. The operation of inclining the steering roller 350 is performed according to the position of the fixing belt 310 in the width direction.

The details of a method for determining the inclination angle according to the present exemplary embodiment will be described below.

Figure 13:
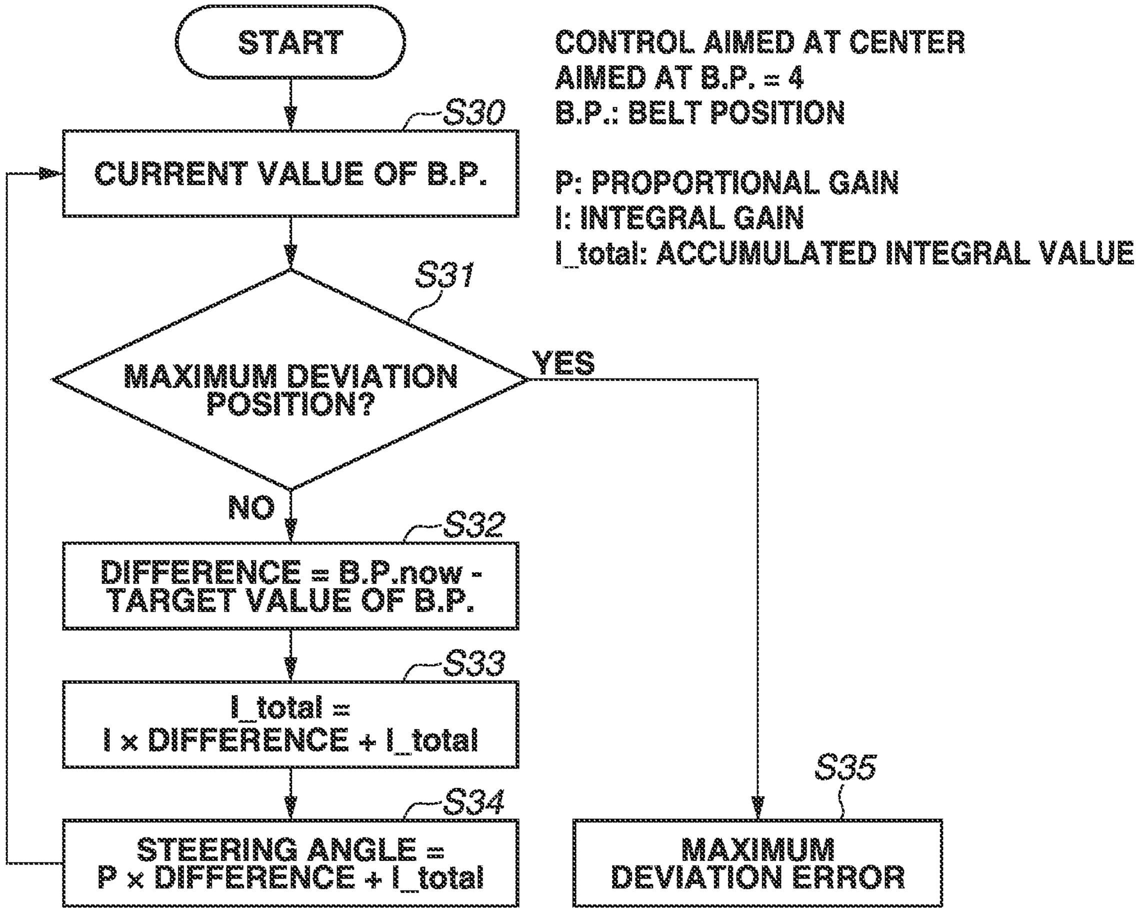
FIG. 13 is a flowchart illustrating steering control for a case where a recording material having a length greater than the predetermined length is conveyed to the fixing nip portion according to a first exemplary embodiment and a third exemplary embodiment.
Figure 14:
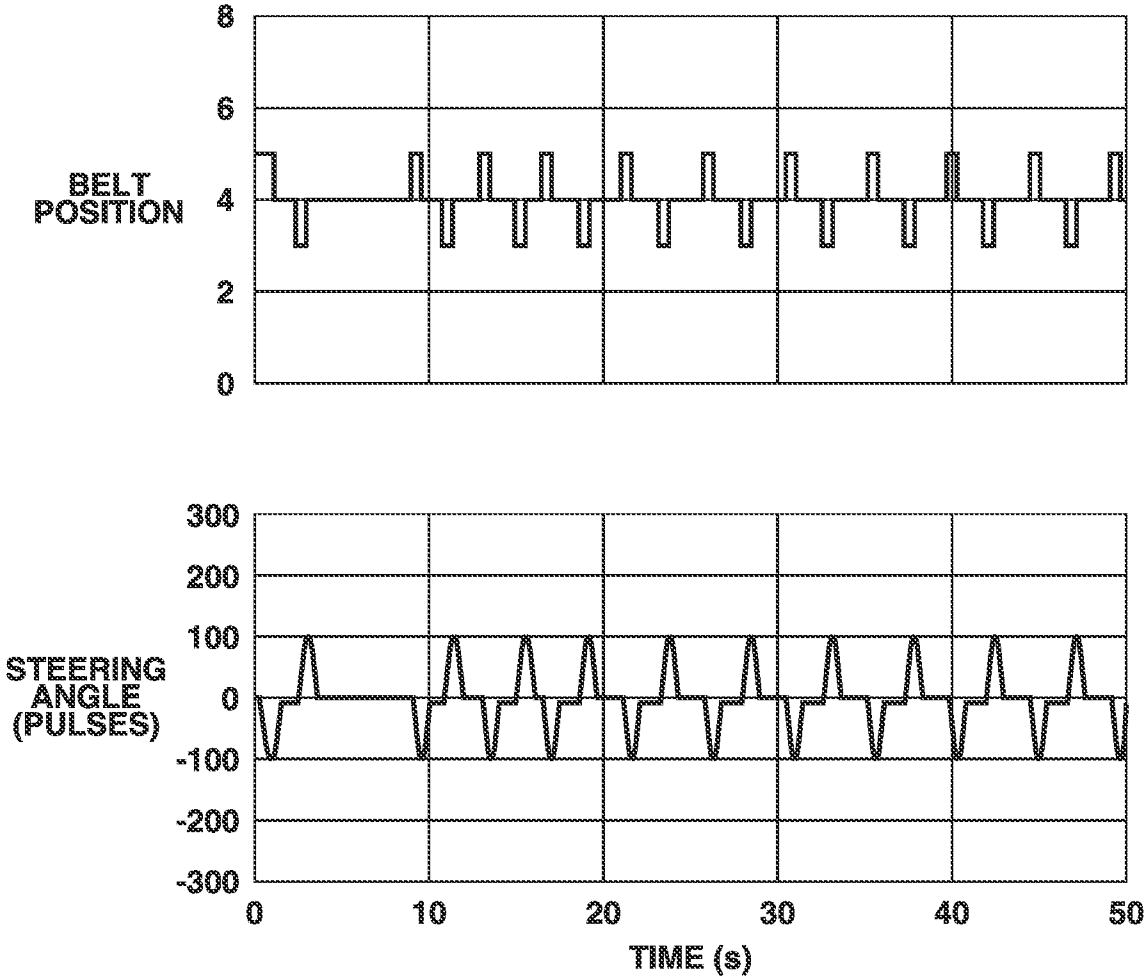
FIG. 14 is a diagram illustrating the relationship between the position of the fixing belt and the inclination angle of the steering roller in a case where a recording material having a length greater than the predetermined length is conveyed to the fixing nip portion according to the first and third exemplary embodiments.

In the present exemplary embodiment, a target position of the fixing belt 310 is set (the target position in the present exemplary embodiment is the "middle" position), and the operation of inclining the steering roller 350 is performed so that the fixing belt 310 is moved to the target position. A description will be given of a specific method for determining the inclination angle when a long sheet is conveyed to the fixing nip portion N with reference to a flowchart in FIG. 13.

First, in step S30, the belt position detection unit 393 detects the position of the fixing belt 310.

In step S31, if the position of the fixing belt 310 is the maximum deviation position (YES in step S31), the processing proceeds to step S35. In step S35, the control unit 600 indicates a maximum deviation error.

If the position of the fixing belt 310 is not the maximum deviation position (NO in step S31), the processing proceeds to step S32.

In step S32, based on the detection result (B.P.now) of the belt position detection unit 393, a difference B.P.dif between B.P.now and the "middle" position as the target position is obtained.

A number from 1 to 7 is substituted for B.P.now. The relationship between the position of the fixing belt 310 and the number substituted for B.P.now is as illustrated in FIG. 20. For example, if the fixing belt 310 is located at the "front 3" position (the first predetermined position), 1 is substituted. If the fixing belt 310 is located at the "back 3" position, 7 is substituted.

$$B.P.dif=4-B.P.now \quad \text{formula 1}$$

In step S33, an accumulated integral value I_total in one step before is added to the product of integral gain I and the difference B.P.dif. The initial value of the accumulated integral value I_total is 0.

$$I\_total(n)=I\times B.P.dif+I\_total(n-1) \quad \text{formula 2}$$

In step S34, the total of the product of proportional gain P and the difference B.P.dif and the accumulated integral value I_total(n) is set as the steering angle.

$$\text{Steering angle}=P\times B.P.dif+I\_total(n) \quad \text{formula 3}$$

In the present exemplary embodiment, the proportional gain P is 100, and the integral gain I is 1. The calculations are made every 0.2 seconds. For example, if the detection result of the belt position detection unit 393 is the "back 1" position, 5 is substituted for B.P.now. The steering angle in this case is as follows.

$$\text{Steering angle}=100\times(4-5)+1\times(4-5)=-101$$

The inclination angle of the steering roller 350 is determined based on the value of the steering angle obtained by the above calculations.

In the present exemplary embodiment, if B.P.now is 1, the steering angle is 303. Similarly, if B.P.now is 2, 3, 4, 5, 6, or 7, the steering angle is 202, 101, −101, 0, −202, or −303, respectively. Every time the number of B.P.now changes by 1, the amount of the steering angle changes by ±101. Thus, the amount of change in the inclination angle by a single inclination operation for inclining the steering roller 350 is equal.

As described above, if the amount of change in the inclination angle by a single inclination operation with each value of B.P.now is the same, the amount of change in the inclination angle by a single inclination operation with each value of B.P.now is set as the maximum amount of change in the inclination angle.

The present disclosure, however, is not limited to this. Alternatively, a configuration may be employed in which the amount of change in the inclination angle by a single inclination operation for inclining the steering roller 350 may differ.

The inclination angle has positive and negative values with respect to the steering roller 350*a*. If the value obtained by formulas 1 to 3 is positive, the operation of inclining the steering roller 350 for the purpose of moving the fixing belt 310 to the other end portion side of the steering roller 350 is performed. The steering roller 350 is inclined counterclockwise with respect to the plane of the paper in FIG. 10. Similarly, if the value of the steering angle is negative, the operation of inclining the steering roller 350 for the purpose of moving the fixing belt 310 to the one end portion side of the steering roller 350 is performed.

FIG. 10 illustrates a case where the steering angle of the steering roller 350*a* is 0, and the steering roller 350*a* is parallel to the heating roller 340. The present disclosure, however, is not limited to this. There is also a case where the steering roller 350*a* is not parallel to the heating roller 340 due to variation in assembly accuracy. Thus, some shifting of the position of the steering roller 350 is permissible.

Figure 11:
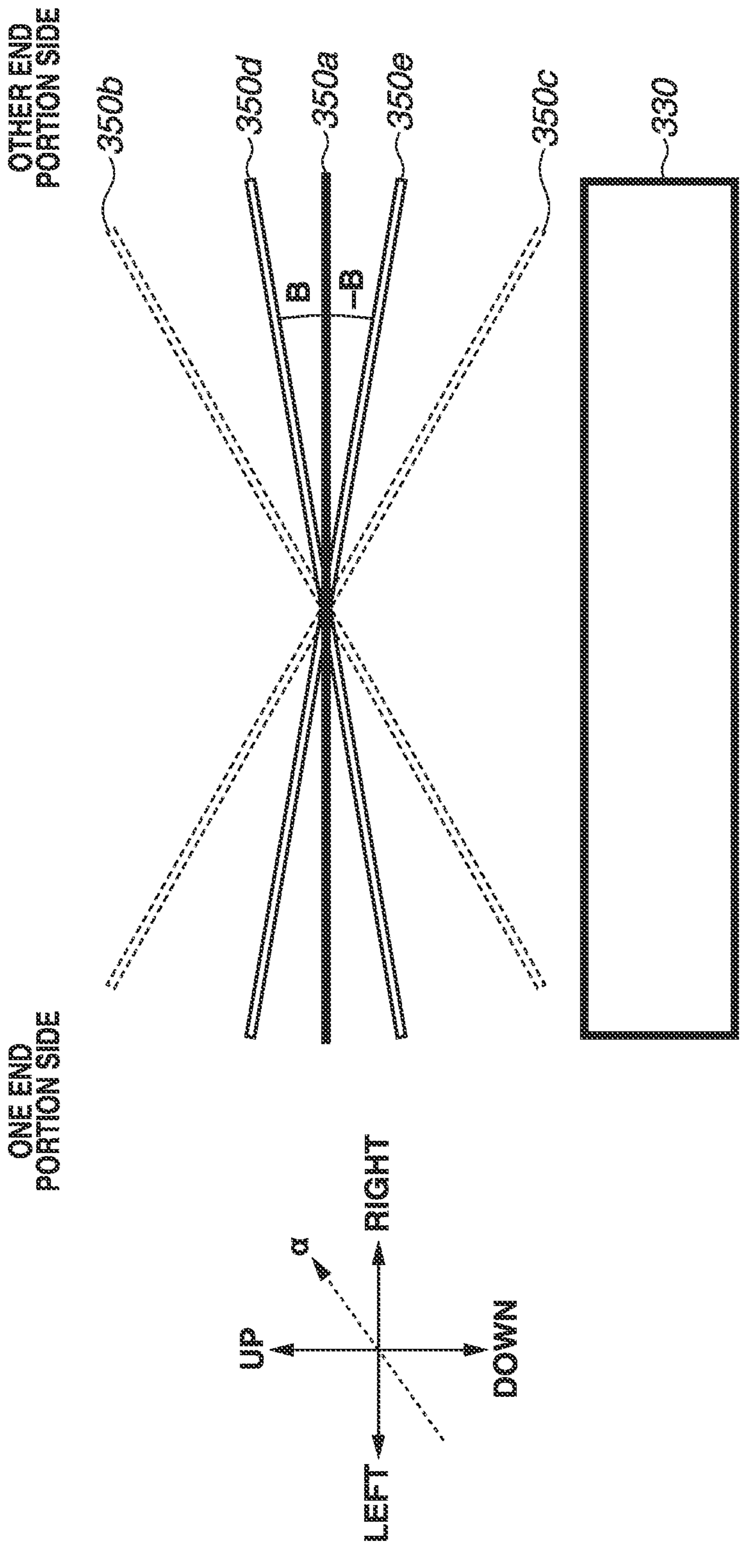
FIG. 11 is a diagram illustrating inclination angles (B and −B) of the steering roller.
Figure 12:
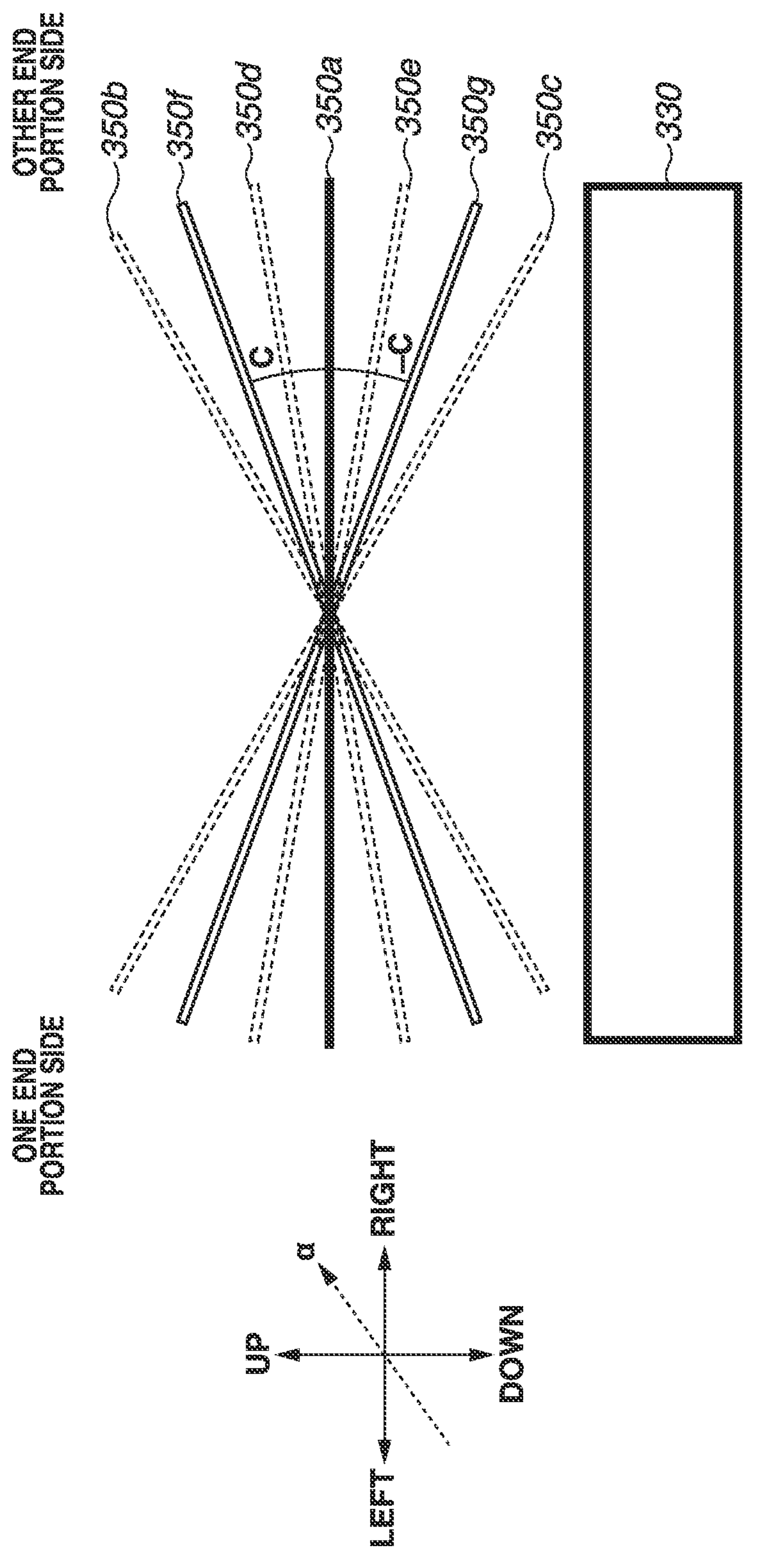
FIG. 12 is a diagram illustrating inclination angles (C and −C) of the steering roller.

The greater the absolute value of the obtained steering angle is, the greater the amount of clockwise or counter-clockwise movement of the steering roller 350*a* illustrated in FIG. 10, 11, or 12.

That is, the further the position of the fixing belt 310 is from the "middle" position as the target position in the width direction, the greater the inclination angle of the steering roller 350 is. If the position of the fixing belt 310 is located at the "middle" position as the target position based on formulas 1, 2, and 3, the steering angle is 0 in the present exemplary embodiment. At this time, the steering roller 350 is inclined so that the fixing belt 310 is maintained at the "middle" position. Consequently, if the position of the fixing belt 310 is located at the "middle" position as the target position, it is possible to prevent the fixing belt 310 from moving from the target position to the other end portion side or the one end portion side of the steering roller 350.

In the above steering control, the operation of inclining the steering roller 350 is performed according to the position of the fixing belt 310 in the width direction. That is, the operation of inclining the steering roller 350 is performed so that the fixing belt 310 is maintained at the "middle" position in the width direction.

The above steering control is characterized in that positions on the fixing belt 310 where the operation of inclining the steering roller 350 is performed in the width direction are also present further on the "middle" position side compared to a case where a recording material having a length less than or equal to the predetermined length is conveyed to the fixing nip portion N. This indicates that the number of positions on the fixing belt 310 where the operation of inclining the steering roller 350 is performed in the width direction is greater in a case where a recording material having a length greater than the predetermined length is conveyed to the fixing nip portion N than in a case where a recording material having a length less than or equal to the predetermined length is conveyed to the fixing nip portion N.

Positions on the fixing belt 310 where the operation of inclining the steering roller 350 is performed are also present on the "middle" position side, which means that there are more number of positions on the fixing belt 310 where the operation of inclining the steering roller 350 is performed in the width direction. Consequently, the amount of movement in the width direction of the fixing belt 310 is smaller than in a case where positions on the fixing belt 310 where the operation of inclining the steering roller 350 is performed are not present on the "middle" position side, and the number of positions on the fixing belt 310 where the operation of inclining the steering roller 350 is performed is not great. The amount of movement of the fixing belt 310 in the width direction is smaller, whereby the amount of movement in the width direction of the recording material is smaller. The amount of movement of the recording material in the width direction is smaller, whereby it is possible to prevent the occurrence of wrinkles in the recording material.

In the present exemplary embodiment, in a case where a recording material having a length less than or equal to the predetermined length is conveyed to the fixing nip portion N, the operation of inclining the steering roller 350 is not performed at the "front 1" position (the second predetermined position). In a case where a recording material having a length greater than the predetermined length is conveyed to the fixing nip portion N, the operation of inclining the steering roller 350 at a second inclination angle ("B" in FIG. 11) is performed at the "front 1" position (the second predetermined position).

On the plane of the paper in FIG. 11, the second inclination angle is the angle at which the steering roller 350 is inclined with respect to the steering roller 350*a* for the purpose of moving the fixing belt 310 to the other end portion side of the steering roller 350. If the steering roller 350 is inclined counterclockwise with respect to the plane of the paper, which is the first direction, the fixing belt 310 is moved to the other end portion side of the steering roller 350. If the belt position detection unit 393 detects that the fixing belt 310 is located at the "front 1" position (the second predetermined position), the steering roller 350*a* is inclined to a position on the steering roller 350*a* side with respect to the position of the steering roller 350*b*, namely the position of a steering roller 350*d*. The inclination angle at this time is the second inclination angle (an angle B). That is, the relationship between the first and second inclination angles is the first inclination angle >the second inclination angle.

Similarly, if the belt position detection unit 393 detects that the fixing belt 310 is located at the "back 1" position, the steering roller 350 is inclined clockwise with respect to the plane of the paper, which is the second direction, and the fixing belt 310 is moved to the one end portion side of the steering roller 350. In this case, the steering roller 350 is inclined to a position further on the steering roller 350*a* side than in a case where the steering roller 350 is inclined at the angle −A, namely the position of a steering roller 350*e* (an angle −B).

In a case where a long sheet is conveyed to the fixing nip portion N, the operation of inclining the steering roller 350 at a third inclination angle is performed at the "front 2" position (a third predetermined position).

On the plane of the paper in FIG. 12, the third inclination angle is the angle at which the steering roller 350 is inclined with respect to the steering roller 350*a* for the purpose of moving the fixing belt 310 to the other end portion side of the steering roller 350. If the steering roller 350 is inclined counterclockwise with respect to the plane of the paper, the fixing belt 310 is moved to the other end portion side of the steering roller 350. If the belt position detection unit 393 detects that the fixing belt 310 is located at the "front 2" position (the third predetermined position), the steering roller 350 is inclined to a position further on the steering roller 350*b* side than in a case where the steering roller 350 is inclined at the second inclination angle, namely the position of a steering roller 350*f*. The inclination angle at this time is the third inclination angle (an angle C). That is, the relationships between the first, third, and second inclination angles are the first inclination angle>the third inclination angle>the second inclination angle.

Similarly, if the belt position detection unit 393 detects that the fixing belt 310 is located at the "back 2" position, the steering roller 350 is inclined clockwise with respect to the plane of the paper, which is the second direction, and the fixing belt 310 is moved to the one end portion side of the steering roller 350. In this case, the steering roller 350 is inclined to a position further on the steering roller 350*c* side than in a case where the steering roller 350 is inclined at the angle −B, namely the position of a steering roller 350*g* (an angle −C).

The steering roller 350 is inclined at the angles B, −B, C, and −C. The amount of change in the inclination angle by a single inclination operation for inclining the steering roller 350 in a case where a recording material having a length less than or equal to the predetermined length is conveyed to the fixing nip portion N is from the angle A to the angle −A. In contrast, the amount of change in the inclination angle by a single inclination operation for inclining the steering roller 350 in a case where a recording material having a length greater than the predetermined length is conveyed to the fixing nip portion N has six types, namely from the angle A to the angle C, from the angle C to the angle B, from the angle B to a steering angle of 0, from the angle −A to the angle −C, from the angle −C to the angle −B, and from the angle −B to a steering angle of 0 (the types of amounts of change from the angle C to the angle A, from the angle B to the angle C, from a steering angle of 0 to the angle B, from the angle −C to the angle −A, from the angle −B to the angle −C, and from a steering angle of 0 to the angle −B also have similar angles). In the present exemplary embodiment, the six types of amounts of change are the same, and therefore, the maximum amount of change in the inclination angle by a single inclination operation applies to all the six types. These six types of amounts of change in the inclination angle are smaller than the amount of change from the angle A to the angle −A (or from the angle −A to the angle A), which is the amount of change in the inclination angle by a single inclination operation in a case where a recording material having a length less than or equal to the predetermined length is conveyed to the fixing nip portion N. Thus, the amount of change in the inclination angle by a single inclination operation for inclining the steering roller 350 in a case where a long sheet is conveyed to the fixing nip portion N is smaller than in a case where a recording material having a length less than or equal to the predetermined length is conveyed to the fixing nip portion N. The amount of change in the inclination angle is smaller, whereby the amount of movement of the fixing belt 310 in the width direction is smaller. The amount of movement of the fixing belt 310 is smaller, whereby the amount of movement of the recording material in the width direction is smaller. This prevents the twist of the recording material that occurs in the fixing nip portion N. This can prevent wrinkles that occur in the recording material.

In a case where a recording material having a length less than or equal to the predetermined length is conveyed to the fixing nip portion N, the operation of inclining the steering roller 350 is not performed at the "front 1", "front 2", "back 1", and "back 2" positions.

In contrast, in a case where a recording material having a length greater than the predetermined length is conveyed to the fixing nip portion N, the operation of inclining the steering roller 350 is performed at the "front 1", "front 2", "back 1", and "back 2" positions. That is, in a case where a recording material having a length greater than the predetermined length is conveyed to the fixing nip portion N, the operation of inclining the steering roller 350 for the purpose of moving the fixing belt 310 to the "middle" position is performed at a position closer to the "middle" position in the width direction than in a case where a recording material having a length less than or equal to the predetermined length is conveyed to the fixing nip portion N. The operation of inclining the steering roller 350 for the purpose of moving the fixing belt 310 to the "middle" position is performed at a position closer to the "middle" position, whereby it is possible to reciprocate the fixing belt 310 in a narrower range.

In the present exemplary embodiment, in a case where a recording material having a length greater than the predetermined length is conveyed to the fixing nip portion N, the range between the "front 1" and "back 1" positions is the movement range of the fixing belt 310 in the width direction. On the other hand, in a case where a recording material having a length less than or equal to the predetermined length is conveyed to the fixing nip portion N, the range between the "front 3" and "back 3" positions is the movement range of the fixing belt 310 in the width direction.

The further the fixing belt 310 moves from the "back 1" position to the "back 3" position in the width direction, the greater the distance between the center position of the movement range of the fixing belt 310 and the center position of the fixing belt 310 is. Similarly, the further the fixing belt 310 moves from the "front 1" position to the "front 3" position, the greater the distance between the center position of the movement range of the fixing belt 310 and the center position of the fixing belt 310 is. After the fixing belt 310 moves from the "middle" position, in a case where a recording material having a length greater than the predetermined length is conveyed to the fixing nip portion N, the operation of inclining the steering roller 350 is performed first in the state where the position of the fixing belt 310 is the "front 1" or "back 1" position. On the other hand, in a case where a recording material having a length less than or equal to the predetermined length is conveyed to the fixing nip portion N, the operation of inclining the steering roller 350 is performed first in the state where the position of the fixing belt 310 is the "front 3" or "back 3" position. Thus, it can be said that after the center position of the fixing belt 310 moves away from the center of the movement range of the fixing belt 310 in the width direction, the distance between the center position of the fixing belt 310 for which the operation of inclining the steering roller 350 is performed first and the center position of the movement range of the fixing belt 310 is smaller in a case where a recording material having a length greater than the predetermined length is conveyed to the fixing nip portion N than in a case where a recording material having a length less than or equal to the predetermined length is conveyed to the fixing nip portion N.

A toner image is shifted in the transfer nip n2 by the fixing nip portion N in a case where "the length of the recording material in the conveying direction>the distance between the transfer nip portion n2 and the fixing nip portion N". If a setting is made to obtain the relationship "the predetermined length of the recording material≤the distance between the transfer nip portion n2 and the fixing nip portion N" as in the first exemplary embodiment, the effect of the present exemplary embodiment is obtained in all recording materials satisfying "the length of the recording material in the conveying direction>the distance between the transfer nip portion n2 and the fixing nip portion N", which is desirable.

In a case where recording materials having a length greater than the predetermined length are successively conveyed to the fixing nip portion N, and even during the fixing of an image or even in a sheet non-passing state (between sheets) where a recording material is not conveyed to the fixing nip portion N, the steering control for a case where a recording material having a length greater than the predetermined length is conveyed to the fixing nip portion N is performed. In the sheet non-passing state, if the steering control for a case where a recording material having a length less than or equal to the predetermined length is conveyed to the fixing nip portion N is applied, it takes approximately 1.5 seconds to perform a single operation of inclining the steering roller 350. Thus, if a recording material having a length greater than the predetermined length is conveyed to the fixing nip portion N in the sheet non-passing state, it may be possible that the steering control for a case where a recording material having a length greater than the predetermined length cannot be performed in time. To prevent this, in a case where recording materials having a length greater than the predetermined length are successively conveyed to the fixing nip portion N, the steering control for a case where a recording material having a length greater than the predetermined length is conveyed to the fixing nip portion N is performed.

The inclination angle of the steering roller 350 in a case where a recording material having a length greater than the predetermined length is conveyed to the fixing nip portion N is made smaller than the inclination angle of the steering roller 350 in a case where a recording material having a length less than or equal to the predetermined length is conveyed to the fixing nip portion N, thereby reducing the moving speed of the fixing belt 310 in the width direction. As a result, the movement in the width direction of a long sheet is also reduced. The details and the effect of this method will be described below.

The distance between the transfer nip portion n2 and the fixing nip portion N is 1000 mm. The predetermined length is 500 mm.

Figure 15:
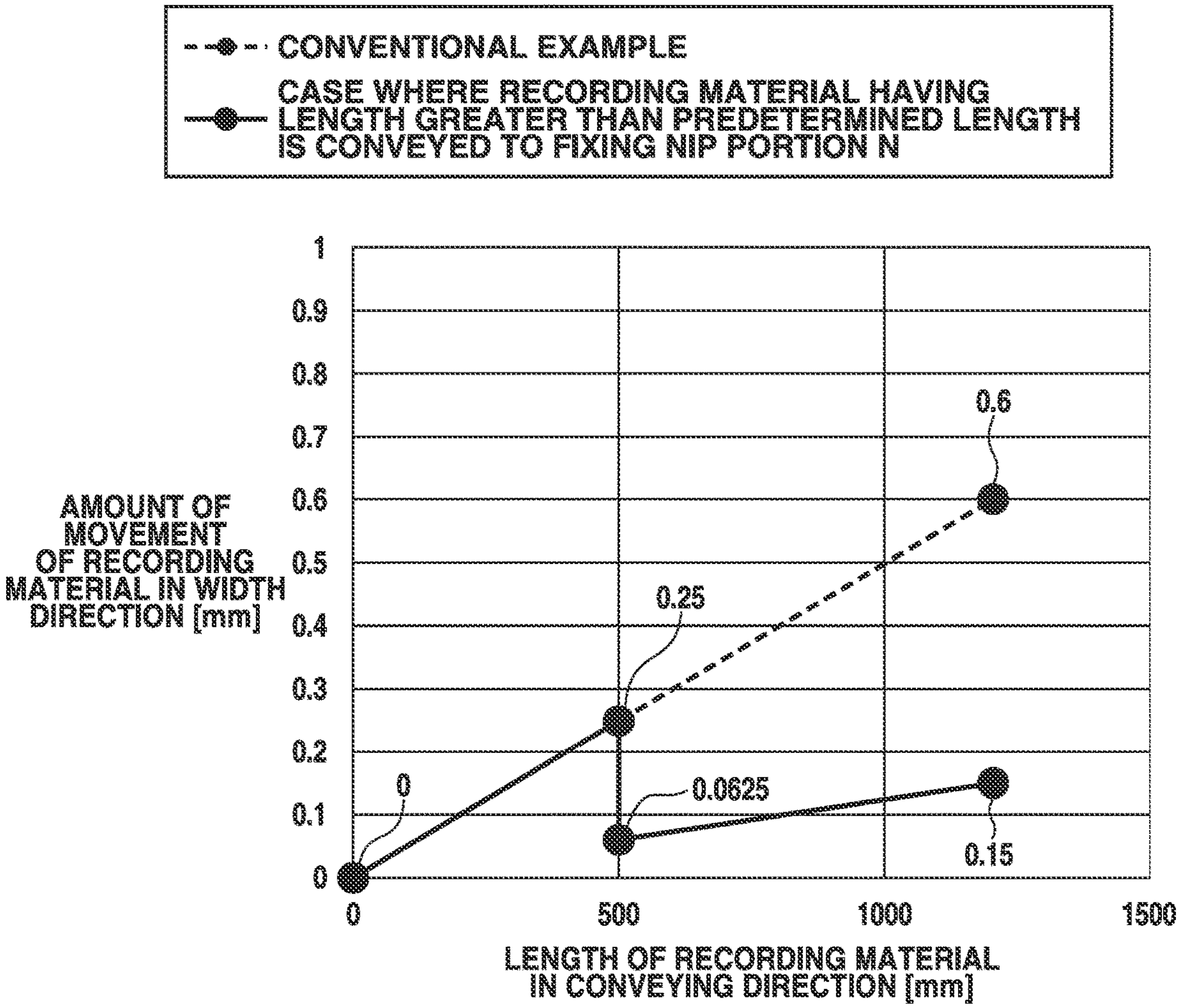
FIG. 15 is a diagram illustrating a relationship between a length of a recording material in a conveying direction and an amount of movement of the recording material in a width direction according to the first exemplary embodiment.

FIG. 15 is a diagram illustrating the length of a recording material in the conveying direction and the amount of movement of the recording material in the width direction.

In FIG. 15, the horizontal axis represents the length of the recording material in the conveying direction, and the vertical axis represents the amount of movement of the recording material in the width direction. A conventional example (a case where deviation control for a case where a recording material having a length less than or equal to the predetermined length is conveyed to the fixing nip portion N according to the first exemplary embodiment is performed) is indicated by a dotted line, and a case where a recording material having a length greater than the predetermined length is conveyed to the fixing nip portion N according to the first exemplary embodiment is indicated by a solid line.

The longer the length of the recording material in the conveying direction is, the greater the amount of movement in the width direction of the recording material is. Thus, the length of the recording material in the conveying direction and the amount of movement of the recording material in the width direction have a proportional relationship. For example, if a long sheet the length of which in the conveying direction is 1200 mm is fixed by the steering control for a case where a recording material having a length less than or equal to the predetermined length is conveyed to the fixing nip portion N, the amount of movement in the width direction of the long sheet is 0.6 mm. The fixing belt 310 at this time is reciprocated between the "front 3" and "back 3" positions. The inclination angle of the steering roller 350 is the angle A or −A.

In the above description, if the control method for a case where a recording material having a length greater than the predetermined length is conveyed to the fixing nip portion N according to the first exemplary embodiment is applied, the fixing belt 310 is reciprocated between the "front 1" and "back 1" positions. The inclination angle of the steering roller 350 is the angle B or −B.

In the present exemplary embodiment, the inclination angles A, B, and C of the steering roller 350 are 6 degrees, 2 degrees, and 4 degrees, respectively. Thus, the inclination angle B is ⅓ times the inclination angle A. In a case where a recording material having a length greater than the predetermined length is conveyed to the fixing nip portion N, the inclination angle of the steering roller 350 is the angle B or −B. This prevents the movement of the long sheet in the width direction. As illustrated in FIG. 15, which is the result of performing simulation using the present exemplary embodiment, if a long sheet the length of which in the conveying direction is 1200 mm is fixed using the configuration of the steering control for a case where a recording material having a length greater than the predetermined length is conveyed to the fixing nip portion N according to the first exemplary embodiment, the amount of movement in the width direction is 0.15 mm. In a case where the steering control in the conventional example is used, the amount of movement in the width direction is 0.6 mm. The amount of movement in the width direction in a case where the exemplary embodiment is used is reduced to ¼ times that in a case where the conventional example is used. It is possible to prevent wrinkles that occur in the recording material in the fixing nip portion N by reducing the amount of movement of the fixing belt 310 in the width direction.

Figure 16:
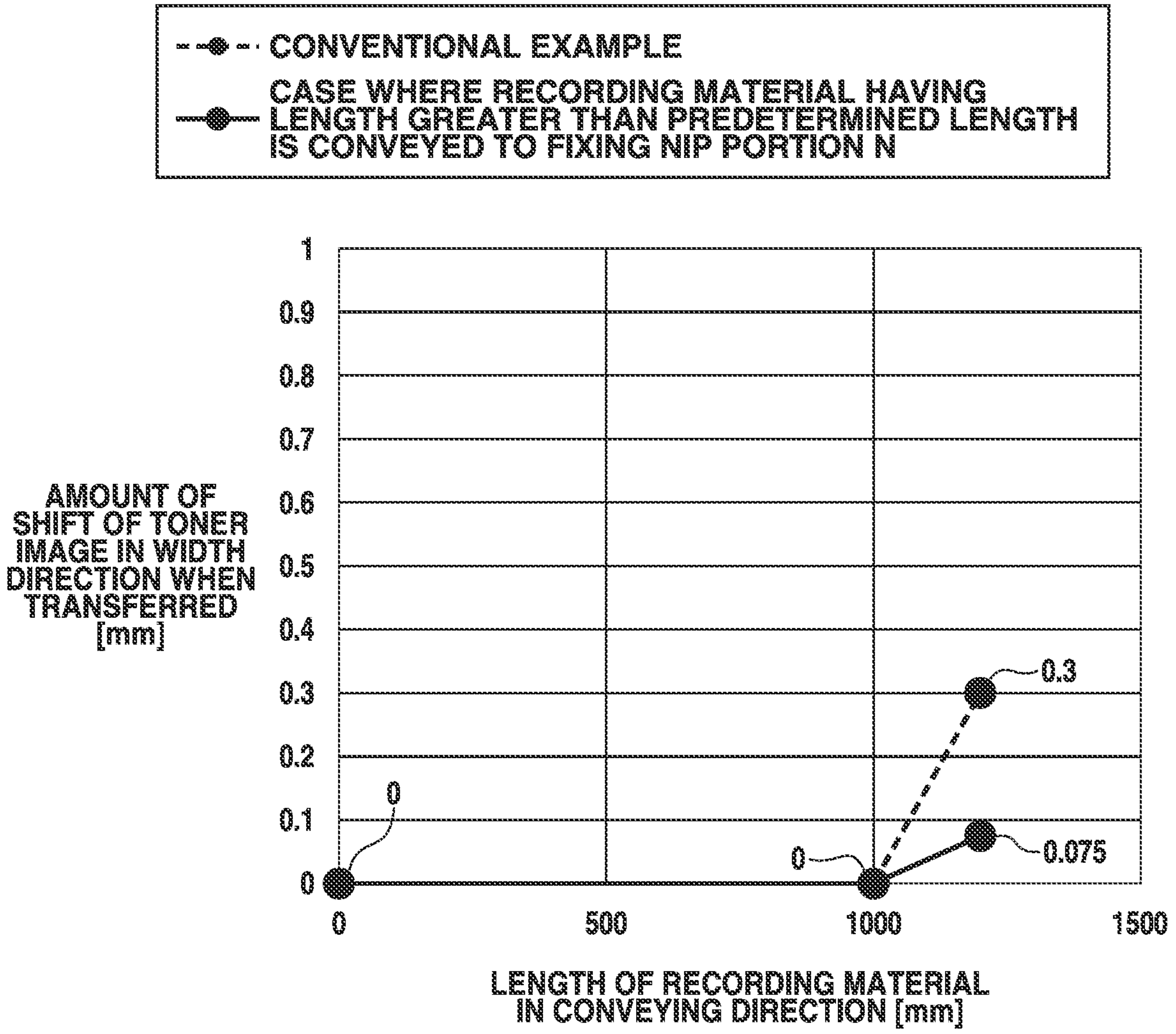
FIG. 16 is a diagram illustrating a length of a recording material in a conveying direction and an amount of shift of a toner image in a width direction when transferred according to the first exemplary embodiment.

FIG. 16 is a diagram illustrating the length of a recording material in the conveying direction and the amount of shift of a toner image in the width direction when transferred. In FIG. 16, the horizontal axis represents the length of the recording material in the conveying direction, and the vertical axis represents the amount of shift of the toner image in the width direction relative to the recording material. The conventional example is indicated by a dotted line, and a case where the steering control for a case where a recording material having a length greater than the predetermined length is conveyed to the fixing nip portion N according to the first exemplary embodiment is performed is indicated by a solid line.

After the leading edge of the recording material reaches the fixing nip portion N, and if the trailing edge side of the recording material remains in the transfer nip portion n2, the recording material may move in the width direction, and the position of the toner image relative to the recording material may be shifted in the transfer nip portion n2. The amount of shift of the toner image in the width direction is almost proportional to the amount of movement of the recording material in the width direction.

On the other hand, when the leading edge of the recording material reaches the fixing nip portion N, and if the trailing edge side of the recording material finishes passing through the transfer nip portion n2, i.e., if "the length of the recording material in the conveying direction<the distance between the fixing nip portion N and the transfer nip n2", the position of the toner image relative to the recording material is not shifted due to the movement of the recording material in the width direction.

When the length of the recording material in the conveying direction exceeds the distance between the fixing nip portion N and the transfer nip n2, the longer the length of the recording material in the conveying direction is, the greater the amount of shift of the toner image is. For example, if a recording material the length of which in the conveying direction is 1200 mm is fixed using the conventional example, the amount of shift of the toner image in the width direction relative to the recording material is 0.3 mm. The fixing belt 310 at this time is reciprocated between the "front 3" and "back 3" positions. The inclination angle of the steering roller 350 is the angle A or −A.

On the other hand, if the control for a case where a recording material having a length greater than the predetermined length is conveyed to the fixing nip portion N according to the first exemplary embodiment is performed, and if the length of the recording material in the conveying direction exceeds the predetermined length, namely 500 mm, the amount of movement of the fixing belt 310 in the width direction is ¼ times. That is, it is possible to reduce a change in the amount of shift of the toner image in the width direction relative to the recording material to ¼ times. For example, if a long sheet that is a recording material the length of which in the conveying direction is 1200 mm is fixed using the control for a case where a recording material having a length greater than the predetermined length is conveyed to the fixing nip portion N according to the first exemplary embodiment, the amount of shift of the toner image in the width direction relative to the long sheet is 0.075 mm. The fixing belt 310 at this time is reciprocated between the "front 1" and "back 1" positions. The inclination angle of the steering roller 350 is the angle B or −B.

Using the first exemplary embodiment, the amount of shift of the toner image in the width direction relative to the recording material is about ¼ times that in the conventional example (0.3 mm→0.075 mm). If the length of the recording material in the conveying direction>the distance between the fixing nip portion N and the transfer nip n2, the amount of movement of the fixing belt 310 in the width direction is reduced, whereby it is possible to prevent a transfer shift in the transfer nip portion n2.

In a case where the control for a case where a recording material having a length greater than the predetermined length is conveyed to the fixing nip portion N according to the first exemplary embodiment is performed, the moving speed of the fixing belt 310 is smaller and the fixing belt 310 is reciprocated in a range smaller in the width direction than in the conventional example. Thus, an edge portion of the recording material is more likely to pass through the same area in the fixing belt 310 than in the conventional example.

This reduces the effect of preventing an edge scratch formed on the surface of the fixing belt 310 by the edge portion of the recording material. Accordingly, this reduces the effect of improving the durability of the fixing belt 310 to be obtained.

When a recording material having a length greater than the predetermined length is fixed, in some cases, the grade of a product may not greatly differ, or the grade of a product may not be greatly influenced even when the steering control in the conventional example is not changed to the steering control for a case where a recording material having a length greater than the predetermined length is conveyed to the fixing nip portion N according to the first exemplary embodiment. In such a case, for example, a configuration may be employed in which a selection screen for a case where a long sheet is passed is provided on a user interface (UI), and a selection can be made between the mode of performing the control according to the first exemplary embodiment by giving priority to the grade of a product and the mode of performing the control according to the conventional example by giving priority to the durability.

A second exemplary embodiment will be described. The first exemplary embodiment is the control method for inclining the steering roller 350 to bring the fixing belt 310 close to the "middle" position. However, positions on the fixing belt 310 where the operation of inclining the steering roller 350 is performed may be similar between the case of a long sheet and the case of a recording material having a length less than or equal to the predetermined length. This is the feature of the second exemplary embodiment. The second exemplary embodiment is different from the first exemplary embodiment in the control and the effect of the operation of inclining the steering roller 350. Thus, the details of the differences will be described below.

<Steering Control in Case where Recording Material Having Length Less than or Equal to Predetermined Length is Conveyed to Fixing Nip Portion N According to Second Exemplary Embodiment>

A control method in a case where a recording material having a length less than or equal to the predetermined length is fixed according to the second exemplary embodiment is similar to that according to the first exemplary embodiment, and therefore will not be described.

<Steering Control in Case where Recording Material Having Length Greater than Predetermined Length is Conveyed to Fixing Nip Portion N According to Second Exemplary Embodiment>

Figure 17:
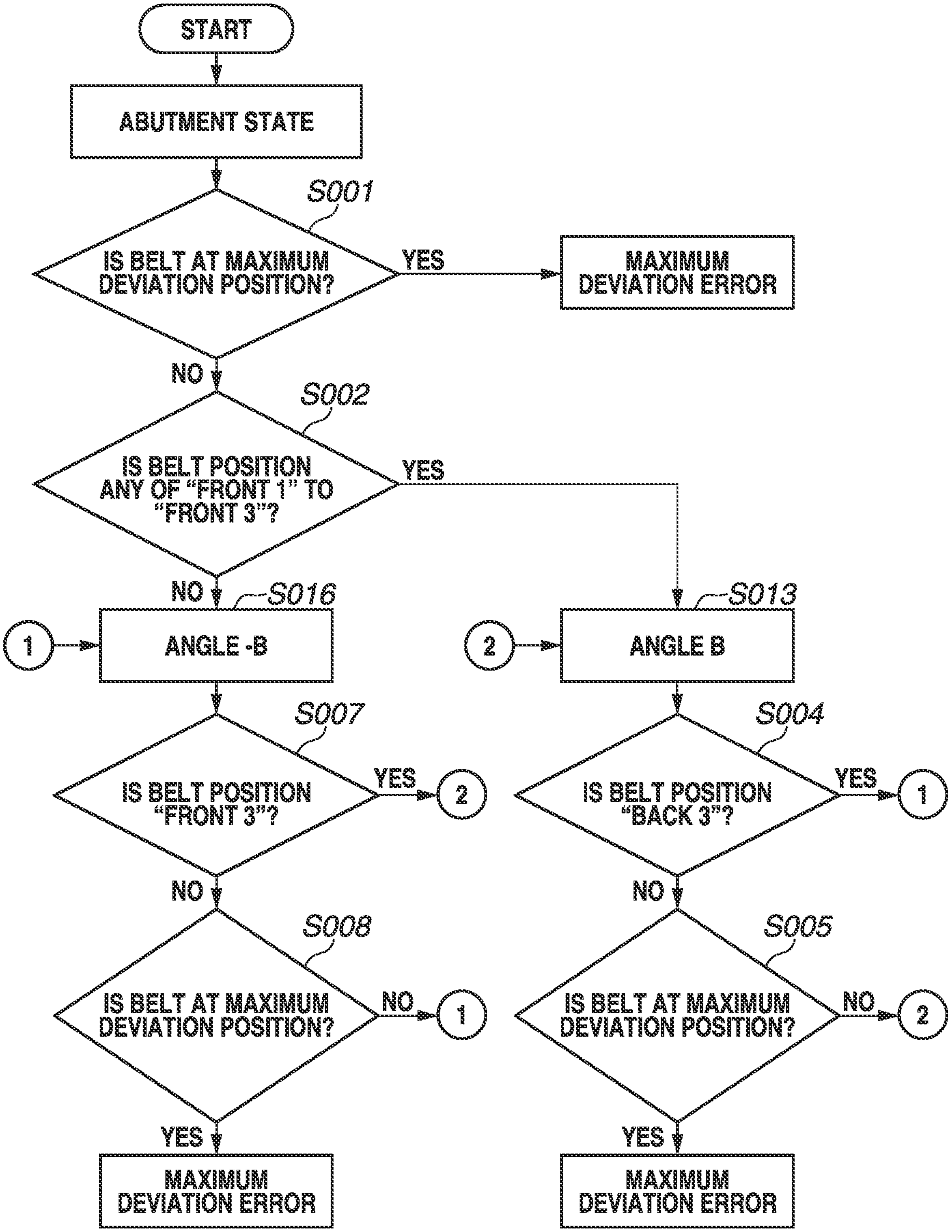
FIG. 17 is a flowchart illustrating steering control for a case where a recording material having a length greater than the predetermined length is conveyed to the fixing nip portion according to a second exemplary embodiment.

A control method for controlling the steering roller 350 according to the second exemplary embodiment is different from the control in the conventional example only in steps S003 and S006 in the flowchart FIG. 8. Thus, only steps S013 and S016 in FIG. 17 will be described here.

In step S013, the operation of inclining the steering roller 350 at the second inclination angle is performed by the steering control. This reduces the amount of movement of the fixing belt 310 in the width direction as compared to the conventional example and prevents the occurrence of wrinkles in a long sheet.

In this case, the inclination angle may not be the second inclination angle. The inclination angle only needs to be an inclination angle smaller than the first inclination angle, which is the angle at which the steering roller 350 is inclined in the conventional example.

As a result of performing the operation of inclining the steering roller 350*a* to the position of the steering roller 350*d*, the steering roller 350 is inclined at the second inclination angle.

It takes approximately 1.5 seconds to change the inclination angle of the steering roller 350. Thus, there is a case where the fixing belt 310 goes beyond the "front 3" position to the first maximum deviation position side (overshoot). If the belt position detection unit 393 detects that the fixing belt 310 reaches the first maximum deviation position and is located at the first maximum deviation position, the control unit 600 indicates a maximum deviation error.

On the other hand, a case is also possible where the fixing belt 310 reaches a position beyond the "front 3" position to the first maximum deviation position side but does not reach the first maximum deviation position. In this case, the steering roller 350 is inclined at the second inclination angle, thereby moving the fixing belt 310 from the position between the "front 3" position and the first maximum deviation position to the other end portion side of the steering roller 350. Consequently, the belt position detection unit 393 detects that the fixing belt 310 is located at the "front 3" position, but the inclination angle of the steering roller 350 is the second inclination angle B in the first direction.

Since the steering roller 350 is inclined at the second inclination angle, the fixing belt 310 is moved to the "front 2", "front 1", "middle", "back 1", and "back 2" positions in this order. While the fixing belt 310 is moved to the other end portion side, the belt position detection unit 393 detects the position of the fixing belt 310 at the "front 2" position, the “front 1” position (the second predetermined position), the “middle” position, the “back 1” position, and the “back 2” position, but the operation of changing the inclination angle of the steering roller 350 by the steering control is not performed. The steering roller 350 is inclined at the second inclination angle.

Alternatively, a configuration may be employed in which the belt position detection unit 393 does not detect that the fixing belt 310 is located at the “front 2” position, the “front 1” position (the second predetermined position), the “middle” position, the “back 1” position, and the “back 2” position, and the operation of inclining the steering roller 350 by the steering control is not performed.

In step S016, the operation of inclining the steering roller 350 at the angle −B for the purpose of moving the fixing belt 310 to the one end portion side is performed by the steering control by the steering mechanism 400. The inclination angle in this case may not be the angle −B. The inclination angle only needs to be an angle smaller than the angle −A, which is the angle at which the steering roller 350 is inclined in the conventional example.

As a result of performing the operation of inclining the steering roller 350*a* to the position of the steering roller 350*e*, the steering roller 350 is inclined at the angle −B.

It takes approximately 1.5 seconds to change the inclination angle of the steering roller 350. Thus, there is a case where the fixing belt 310 goes beyond the “back 3” position to the second maximum deviation position side (overshoot). If the belt position detection unit 393 detects that the fixing belt 310 reaches the second maximum deviation position and is located at the second maximum deviation position, the control unit 600 indicates a maximum deviation error.

On the other hand, a case is also possible where the fixing belt 310 reaches a position beyond the “back 3” position to the second maximum deviation position side but does not reach the second maximum deviation position. In this case, the steering roller 350 is inclined at the angle −B, thereby moving the fixing belt 310 from the position between the “back 3” position and the second maximum deviation position to the one end portion side of the steering roller 350. Consequently, the belt position detection unit 393 detects that the fixing belt 310 is located at the “back 3” position, but the inclination angle of the steering roller 350 is the angle −B.

Since the steering roller 350 is inclined at the angle −B, the fixing belt 310 is moved to the “back 2” position, the “back 1” position, the “middle” position, the “front 1” position (the second predetermined position), and the “front 2” position in this order. While the fixing belt 310 is moved to the one end portion side, the belt position detection unit 393 detects the position of the fixing belt 310 at the “back 2” position, the “back 1” position, the “middle” position, the “front 1” position (the second predetermined position), and the “front 2” position, but the operation of inclining the steering roller 350 by the steering control is not performed. The steering roller 350 is inclined at the angle −B.

Alternatively, a configuration may be employed in which the belt position detection unit 393 does not detect that the fixing belt 310 is located at the “back 2”, “back 1”, “middle”, “front 1”, and “front 2” positions, and the operation of inclining the steering roller 350 by the steering control is not performed.

The inclination angle of the steering roller 350 is made smaller than that in the conventional example, whereby it is possible to reduce the moving speed of the fixing belt 310.

A toner image is shifted in the transfer nip n2 by the fixing nip portion N in a case where “the length of the recording material in the conveying direction>the distance between the transfer nip portion n2 and the fixing nip portion N”. If a setting is made to obtain the relationship “the predetermined length of the recording material≤the distance between the transfer nip portion n2 and the fixing nip portion N” as in the second exemplary embodiment, the effect of the present exemplary embodiment is obtained in all recording materials satisfying “the length of the recording material in the conveying direction>the distance between the transfer nip portion n2 and the fixing nip portion N”, which is desirable.

The inclination angle of the steering roller 350 in a case where a long sheet is conveyed to the fixing nip portion N is made smaller than the inclination angle of the steering roller 350 in a case where a recording material having a length less than or equal to the predetermined length is conveyed to the fixing nip portion N, thereby reducing the moving speed of the fixing belt 310 in the width direction. As a result, the movement in the width direction of a long sheet is also reduced. The details and the effect of this method will be described below.

The distance between the transfer nip portion n2 and the fixing nip portion N is 1000 mm. The predetermined length is 500 mm.

<Prevention of Wrinkles that Occur in Long Sheet>

Figure 18:
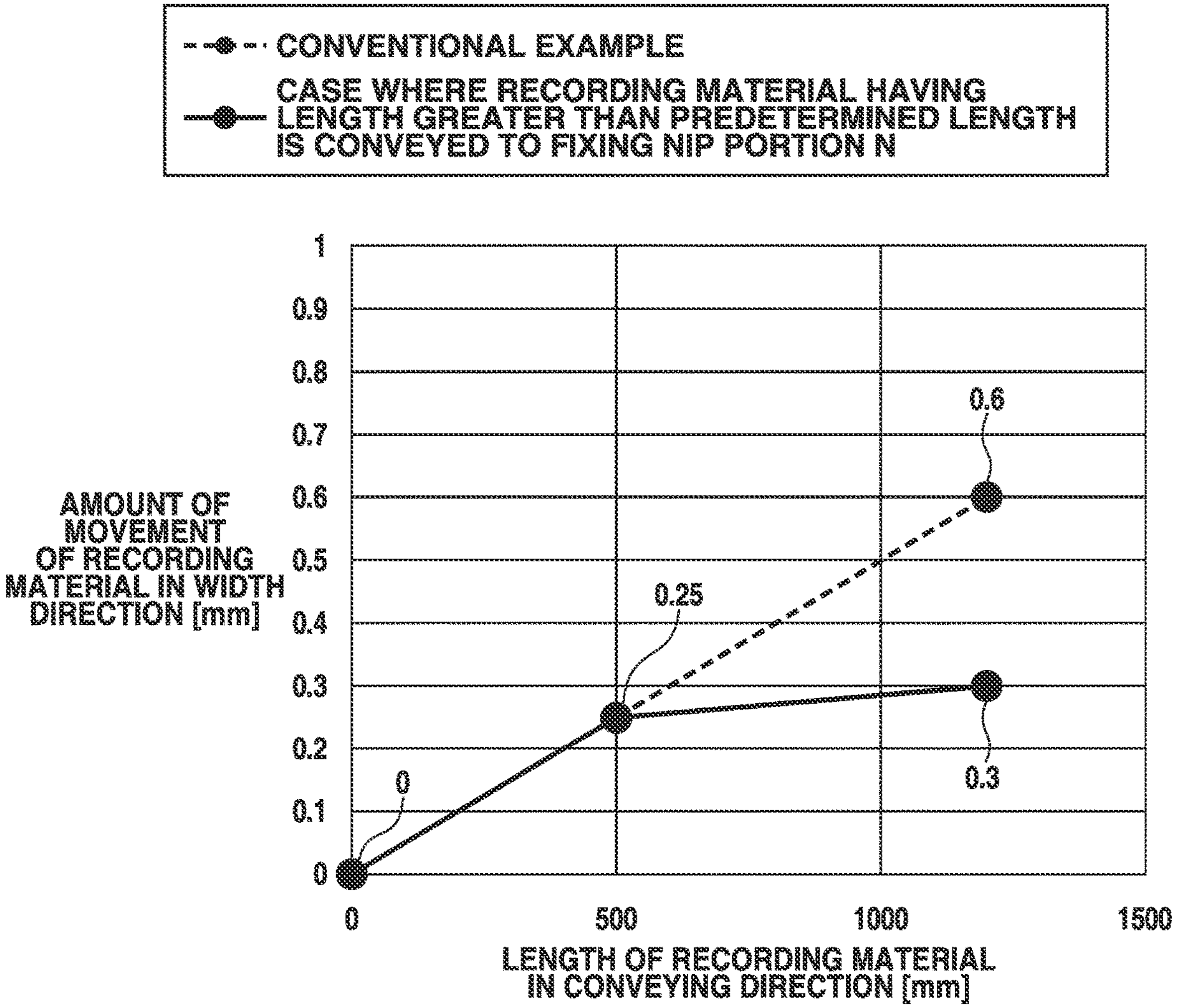
FIG. 18 is a diagram illustrating a relationship between a length of a recording material in a conveying direction and an amount of movement in a width direction of the recording material according to the second exemplary embodiment.

FIG. 18 is a diagram illustrating the length of a recording material in the conveying direction and the amount of movement in the width direction of the recording material.

In FIG. 18, the horizontal axis represents the length of the recording material in the conveying direction, and the vertical axis represents the amount of movement of the recording material in the width direction. The conventional example is indicated by a dotted line, and the second exemplary embodiment is indicated by a solid line.

The longer the length of the recording material in the conveying direction is, the greater the amount of movement of the recording material in the width direction is. Thus, the length of the recording material in the conveying direction and the amount of movement of the recording material in the width direction have a proportional relationship. For example, if a long sheet the length of which in the conveying direction is 1200 mm is fixed by the steering control for a case where a recording material having a length less than or equal to the predetermined length is conveyed to the fixing nip portion N, the amount of movement of the long sheet in the width direction is 0.6 mm. The fixing belt 310 at this time is reciprocated between the “front 3” and “back 3” positions. The inclination angle of the steering roller 350 is the angle A or −A.

In the above description, if the control method according to the second exemplary embodiment is applied, the fixing belt 310 is reciprocated between the “front 3” and “back 3” positions. The inclination angle of the steering roller 350 is the angle B or −B.

In the second exemplary embodiment, the inclination angles A and B of the steering roller 350 in a case where a recording material having a length greater than the predetermined length is conveyed to the fixing nip portion N are 6 degrees and 3 degrees, respectively. Thus, the inclination angle B is ½ times the inclination angle A. In a case where a recording material exceeding the predetermined length is conveyed to the fixing nip portion N, the inclination angle of the steering roller 350 is the angle B or −B. This prevents the movement of the recording material in the width direction. As illustrated in FIG. 18, which is the result of performing simulation using the second exemplary embodiment, if a long sheet the length of which in the conveying direction is 1200 mm is fixed using the configuration of the steering control for a case where a recording material having a length greater than the predetermined length is conveyed to the fixing nip portion N according to the second exemplary embodiment, the amount of movement in the width direction is 0.3 mm. The fixing belt 310 at this time is reciprocated between the "front 3" and "back 3" positions. The inclination angle of the steering roller 350 is the angle B or −B. In a case where the conventional example is used, the amount of movement in the width direction is 0.6 mm. Thus, the amount of movement in the width direction in a case where the steering control for a case where a recording material having a length greater than the predetermined length is conveyed to the fixing nip portion N according to the second exemplary embodiment is used is reduced to ½ times that in a case where the conventional example is used.

Figure 19:
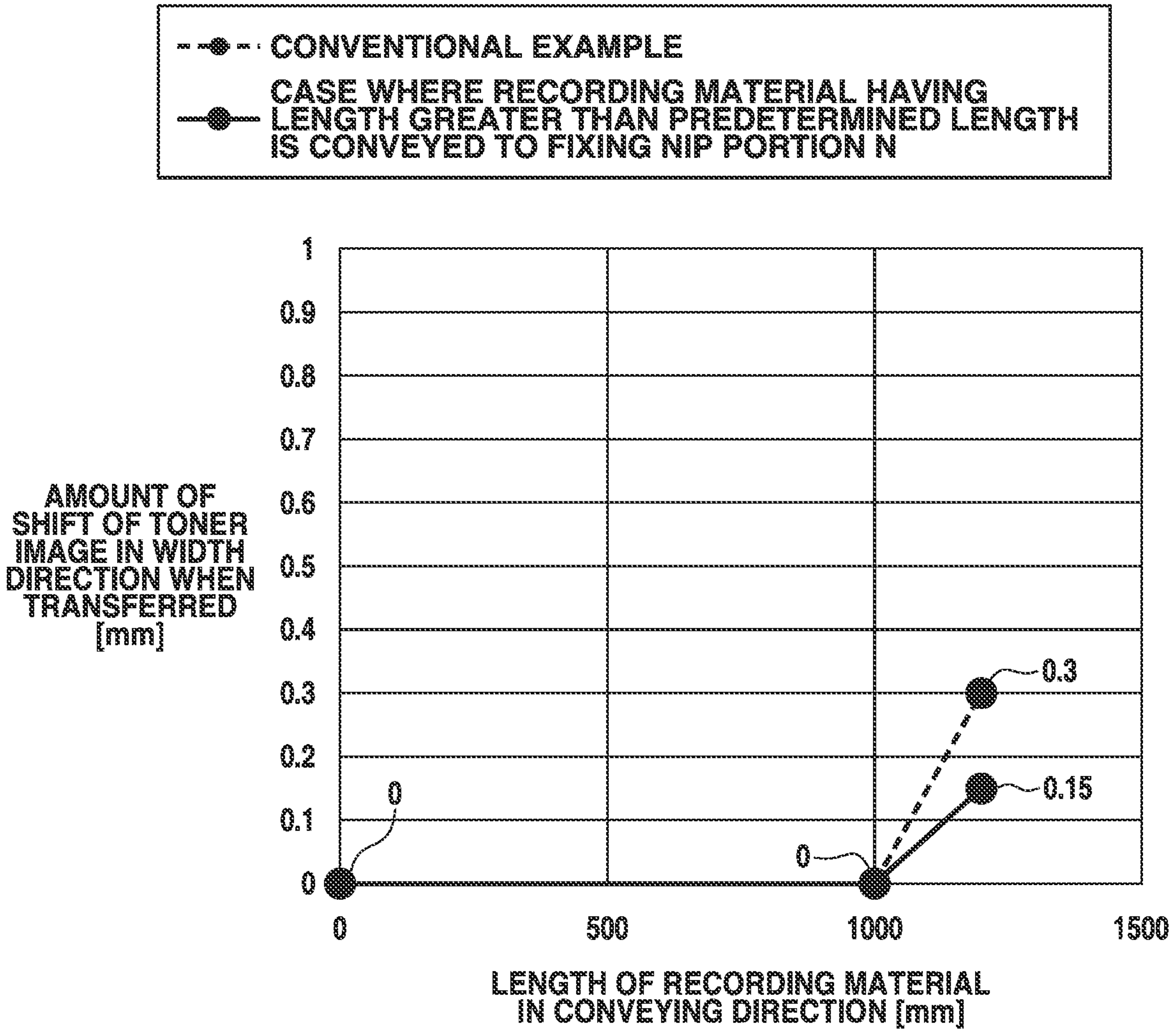
FIG. 19 is a diagram illustrating a length of a recording material in a conveying direction and an amount of shift of a toner image in a width direction when transferred according to the second exemplary embodiment.

FIG. 19 is a diagram illustrating the length of a recording material in the conveying direction and the amount of shift of a toner image in the width direction relative to the recording material. In FIG. 19, the horizontal axis represents the length of the recording material in the conveying direction, and the vertical axis represents the amount of shift of the toner image in the width direction relative to the recording material. The conventional example (a case where deviation control for a case where a recording material having a length less than or equal to the predetermined length is conveyed to the fixing nip portion N is performed) is indicated by a dotted line, and a case where the control according to the present exemplary embodiment is performed is indicated by a solid line.

After the leading edge of the recording material reaches the fixing nip portion N, and if the trailing edge side of the recording material remains in the transfer nip portion n2, the recording material may move in the width direction, and the position of the toner image relative to the recording material may be shifted in the transfer nip portion n2. The amount of shift of the toner image in the width direction is almost proportional to the amount of movement of the recording material in the width direction.

On the other hand, when the leading edge of the recording material reaches the fixing nip portion N, and if the trailing edge side of the recording material finishes passing through the transfer nip portion n2, i.e., if "the length of the recording material in the conveying direction<the distance between the fixing nip portion N and the transfer nip portion n2", the position of the toner image relative to the recording material is not shifted due to the movement in the width direction of the recording material.

When the length of the recording material in the conveying direction exceeds the distance between the fixing nip portion N and the transfer nip n2, the longer the length of the recording material in the conveying direction is, the greater the amount of shift of the toner image is. For example, if a recording material the length of which in the conveying direction is 1200 mm is fixed using the conventional example, the amount of shift of the toner image in the width direction relative to the recording material is 0.3 mm. The fixing belt 310 at this time is reciprocated between the "front 3" and "back 3" positions. The inclination angle of the steering roller 350 is the angle A or −A.

On the other hand, if the steering control for a case where a recording material having a length greater than the predetermined length is conveyed to the fixing nip portion N according to the second exemplary embodiment is performed, and if the length of the recording material in the conveying direction exceeds the predetermined length, namely 500 mm, the amount of movement of the fixing belt 310 in the width direction is ½ times. That is, it is possible to reduce a change in the amount of shift of the toner image in the width direction relative to the recording material to ½ times. For example, if a long sheet that is a recording material the length of which in the conveying direction is 1200 mm is fixed using the second exemplary embodiment, the amount of shift of the toner image in the width direction relative to the long sheet is 0.15 mm. The fixing belt 310 at this time is reciprocated between the "front 3" and "back 3" positions. The inclination angle of the steering roller 350 is the angle B or −B.

Using the steering control for a case where a recording material having a length greater than the predetermined length is conveyed to the fixing nip portion N according to the second exemplary embodiment, the amount of shift of the toner image in the width direction relative to the recording material is about ½ times that in the conventional example (0.3 mm→0.15 mm).

In a case where the control for a case where a recording material having a length greater than the predetermined length is conveyed to the fixing nip portion N according to the second exemplary embodiment is performed, the moving speed of the fixing belt 310 is smaller and the fixing belt 310 is reciprocated in a range smaller in the width direction than in the conventional example. Thus, an edge portion of the recording material is more likely to pass through the same area in the fixing belt 310 than in the conventional example.

This reduces the effect of preventing an edge scratch formed on the surface of the fixing belt 310 by the edge portion of the recording material. This reduces the effect of improving the durability of the fixing belt 310 to be obtained.

In a case where a recording material having a length greater than the predetermined length is fixed, in some cases, the grade of a product may not greatly differ, or the grade of a product may not be greatly influenced even when the steering control in the conventional example is not changed to the steering control for a case where a recording material having a length greater than the predetermined length is conveyed to the fixing nip portion N according to the second exemplary embodiment. In such a case, for example, a configuration may be employed in which a selection screen in a case where a long sheet is passed is provided on a UI, and a selection can be made between the mode of performing the control according to the second exemplary embodiment by giving priority to the grade of a product and the mode of performing the control according to the conventional example by giving priority to the durability.

A toner image is shifted in the transfer nip n2 by the fixing nip portion N in a case where "the length of the recording material in the conveying direction>the distance between the transfer nip portion n2 and the fixing nip portion N". If a setting is made to obtain the relationship "the predetermined length of the recording material the distance between the transfer nip portion n2 and the fixing nip portion N" as in the present exemplary embodiment, the effect of the present exemplary embodiment is obtained in all recording materials satisfying "the length of the recording material in the conveying direction>the distance between the transfer nip portion n2 and the fixing nip portion N", which is desirable.

<Steering Control in Case where Recording Material Having Length Less than or Equal to Predetermined Length is Conveyed to Fixing Nip Portion N According to Third Exemplary Embodiment>

In the control method for a case where a recording material having a length less than or equal to the predetermined length is fixed according to the first or second exemplary embodiment, if it is detected that the fixing belt 310 is located at the "front 3" or "back 3" position, the steering roller 350 is changed to the inclination angle A or −A.

In a third exemplary embodiment, also if it is detected that the fixing belt 310 is located at the "front 2" or "back 2" position in addition to the "front 3" and "back 3" positions, the operation of inclining the steering roller 350 is performed.

The inclination angle of the steering roller 350 is obtained using formulas 1, 2, and 3. In a case where a recording material having a length less than or equal to the predetermined length is conveyed to the fixing nip portion N according to the third exemplary embodiment, a number is substituted for the value of B.P.now according to FIG. 21. Specifically, if the fixing belt 310 is located at the "front 3" position, 2 is substituted for B.P.now. By this method, the inclination angle of the steering roller 350 is determined at every position on the fixing belt 310.

<Steering Control for Case where Recording Material Having Length Greater than Predetermined Length is Conveyed to Fixing Nip Portion N According to Third Exemplary Embodiment>

A control method for a case where a recording material having a length greater than the predetermined length is fixed according to the third exemplary embodiment is similar to the control method for a case where a recording material having a length greater than the predetermined length is fixed according to the first exemplary embodiment, and therefore will not be described.

Based on the value obtained using formulas 1, 2, and 3 used in the first or third exemplary embodiment, the inclination angle of the steering roller 350 is determined, and the operation of inclining the steering roller 350 is performed. In the first or third exemplary embodiment, the amount of change in the inclination angle by a single inclination operation for inclining the steering roller 350 is constant. Specifically, the amount of change in the inclination angle of the steering roller 350 is equal between a case where the fixing belt 310 moves from the "front 2" position to the "front 3" position and a case where the fixing belt 310 moves from the "back 2" position to the "back 3" position.

However, the amount of change in the inclination angle by a single inclination operation for inclining the steering roller 350 may not be constant. A configuration may be employed in which the amount of change in the inclination angle by a single inclination operation for inclining the steering roller 350 differs.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A fixing device comprising:

a fixing belt that is endless and configured to rotate;

a heating roller configured to abut an inner peripheral surface of the fixing belt and apply heat to the fixing belt;

a steering roller configured to abut the inner peripheral surface of the fixing belt together with the heating roller;

a pressurization rotating member configured to pressurize the fixing belt, wherein the pressurization rotating member and the fixing belt form a fixing nip portion and, in a case where a toner bearing recording material bearing unfixed toner is nipped and conveyed to the fixing nip portion, an unfixed toner image is fixed to the toner bearing recording material;

a belt position detection unit configured to detect a position of the fixing belt in a width direction of the fixing belt; and a control unit configured to control, based on a detection result of the belt position detection unit, the steering roller to swing to move the fixing belt to a prescribed position in the width direction, wherein, in a case where a first recording material having a length greater than or equal to a predetermined length in a conveying direction of the first recording material is conveyed to the fixing nip portion, a maximum inclination angle of the steering roller is smaller than the maximum inclination angle of the steering roller in a case where a second recording material having a length less than the predetermined length in the conveying direction is conveyed to the fixing nip portion.

2. The fixing device according to claim 1, further comprising a transfer unit configured to transfer unfixed toner to a recording material in a transfer nip portion formed by a pair of rotating members abutting each other.

3. The fixing device according to claim 2, wherein a length between the transfer nip portion and the fixing nip portion in the conveying direction is greater than or equal to the predetermined length.

4. The fixing device according to claim 1, further comprising a pre-fixing conveying belt that is positioned upstream of the fixing nip portion in the conveying direction and is configured to convey the toner bearing recording material to the fixing nip portion.

5. The fixing device according to claim 1, wherein, after a center position of the fixing belt moves away from a center of a movement range of the fixing belt in the width direction, a distance between the center position of the fixing belt, for which an operation of inclining the steering roller is performed first, and the center position of the movement range of the fixing belt is smaller in a case where the first recording material having the length greater than or equal to the predetermined length in the conveying direction is conveyed to the fixing nip portion than in a case where the second recording material having the length less than the predetermined length in the conveying direction is conveyed to the fixing nip portion.

6. The fixing device according to claim 1, further comprising a pad member disposed on an inner side of the fixing belt, wherein the pad member together with the pressurization rotating member form the fixing nip portion with the fixing belt between the pad member and the pressurization rotating member.

* * * * *